US012254826B2

(12) United States Patent
Yuan

(10) Patent No.: US 12,254,826 B2
(45) Date of Patent: Mar. 18, 2025

(54) DISPLAY PANEL, INTEGRATED CHIP, AND DISPLAY DEVICE

(71) Applicant: Xiamen Tianma Display Technology Co., Ltd., Xiamen (CN)

(72) Inventor: Yong Yuan, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/634,136

(22) Filed: Apr. 12, 2024

(65) Prior Publication Data

US 2024/0265857 A1 Aug. 8, 2024

Related U.S. Application Data

(63) Continuation of application No. 18/103,791, filed on Jan. 31, 2023, now Pat. No. 11,972,722.

(30) Foreign Application Priority Data

Aug. 24, 2022 (CN) ........................ 202211020971.3

(51) Int. Cl.
*G09G 3/30* (2006.01)
*G09G 3/12* (2006.01)
*G09G 3/32* (2016.01)

(52) U.S. Cl.
CPC ....... *G09G 3/32* (2013.01); *G09G 2310/0245* (2013.01); *G09G 2320/0209* (2013.01); *G09G 2330/021* (2013.01)

(58) Field of Classification Search
CPC ............. G09G 3/32; G09G 2310/0245; G09G 2310/0209; G09G 2330/021
See application file for complete search history.

(56) References Cited

U.S. PATENT DOCUMENTS

2021/0027712 A1 1/2021 Kim
2021/0233457 A1 * 7/2021 Xiong ................. G09G 3/2074
2022/0028314 A1 1/2022 Kwon
2022/0366830 A1 11/2022 Zhang
2022/0366835 A1 11/2022 Park
2023/0215364 A1 7/2023 Lim

FOREIGN PATENT DOCUMENTS

CN 114420032 A 4/2022

* cited by examiner

*Primary Examiner* — Sanghyuk Park
(74) *Attorney, Agent, or Firm* — KDW Firm PLLC

(57) ABSTRACT

Provided are a display panel, an integrated chip, and a display device. The display panel includes a first display region, a second display region, and a pixel circuit. The pixel circuit includes a first pixel circuit and a second pixel circuit, where the first pixel circuit is connected to a light-emitting element in the first display region, and the second pixel circuit is connected to a light-emitting element in the second display region. In at least one stage of a working process of the display panel, the light-emitting element in the first display region works in a first brightness mode, the light-emitting element in the second display region works in a second brightness mode, brightness in the first brightness mode is L1, and brightness in the second brightness mode is L2, where L1≠L2.

20 Claims, 20 Drawing Sheets

DISPLAY PANEL, INTEGRATED CHIP, AND DISPLAY DEVICE

CROSS-REFERENCE TO RELATED APPLICATION(S)

This is a continuation of U.S. patent application Ser. No. 18/103,791, filed Jan. 31, 2023, which claims priority to Chinese Patent Application No. 202211020971.3 filed Aug. 24, 2022, the disclosures of which are incorporated herein by reference in their entireties.

TECHNICAL FIELD

The present disclosure relates to the field of display technology and, in particular, to a display panel, an integrated chip configured to provide signals for the display panel, and a display device including the display panel.

BACKGROUND

With the continuous development of display technology and increasing requirements of consumers for display panels, functions integrated into the display panels increase day by day. In some scenarios, the same display panel is required to have different display functions in different regions. For example, requirements for a display region where a game, a movie, and the like are displayed are different from requirements for a display region where characters, time information, and the like are displayed. Differentiated design is performed on these different regions, which can provide relatively good user experience, reduce power consumption, and the like.

A pixel circuit is a key component in a display panel, which determines a drive current received by a light-emitting element of the display panel and further determines the light emission effect of the display panel. When the differentiated design is performed on different regions of the display panel, it is often necessary to respectively adjust their corresponding pixel circuits for different display regions so that the different display regions can have relatively good display effects while implementing their respective functions.

SUMMARY

In view of this, the present application provides a display panel, an integrated chip configured to provide signals for the display panel, and a display device including the display panel, which are used for regionally performing differentiated design on different display regions according to their respective functions, so as to implement the functions of the different display regions.

In one aspect of embodiments of the present application, a display panel is provided.

The display panel includes a first display region, a second display region, and a pixel circuit.

The pixel circuit includes a first pixel circuit and a second pixel circuit, where the first pixel circuit is connected to a light-emitting element in the first display region, and the second pixel circuit is connected to a light-emitting element in the second display region.

The pixel circuit includes a drive transistor and a first presetting module, and a terminal of the first presetting module is connected to the drive transistor.

A control terminal of a first presetting module in the first pixel circuit is configured to receive a first control signal, and a control terminal of a first presetting module in the second pixel circuit is configured to receive a second control signal.

In at least one stage of a working process of the display panel, the light-emitting element in the first display region works in a first brightness mode, the light-emitting element in the second display region works in a second brightness mode, brightness in the first brightness mode is L1, and brightness in the second brightness mode is L2, wherein $L1 \neq L2$.

The pixel circuit comprises a drive transistor and a bias adjustment module, the a bias adjustment module is connected to a first electrode of the drive transistor or a second electrode of the drive transistor and configured to provide a bias adjustment signal for the drive transistor; the bias adjustment module in the first pixel circuit is configured to receive a first bias adjustment signal Vb1, and the bias adjustment module in the second pixel circuit is configured to receive a second bias adjustment signal Vb2; wherein $Vb1 \neq Vb2$.

Alternatively, the pixel circuit comprises an initialization module, and the initialization module is connected to the light-emitting element and configured to provide an initialization signal for the light-emitting element; the initialization module in the first pixel circuit is configured to provide a first initialization signal Vi1, and the initialization module in the second pixel circuit is configured to provide a second initialization signal Vi2; wherein $Vi1 \neq Vi2$ In another aspect of embodiments of the present application, an integrated chip is provided and configured to provide signals for the preceding display panel.

In another aspect of embodiments of the present application, a display device is provided. The display device includes the preceding display panel.

DETAILED DESCRIPTION

To obtain a clearer understanding of objects, features, and advantages of the present disclosure, the present disclosure is further described below in conjunction with drawings and embodiments.

It is to be noted that details are set forth below to facilitate a thorough understanding of the present disclosure. However, the present disclosure can be implemented by various embodiments different from the embodiments described herein, and those skilled in the art may make similar generalizations without departing from the spirit of the present disclosure. Therefore, the present disclosure is not limited to the embodiments disclosed below.

In one aspect of the embodiments of the present application, a display panel is provided. The display panel may be an organic light-emitting diode (OLED) display panel, a micro light emitting diode (microLED) display panel, or another type of display panel, which is not particularly limited in this embodiment.

Figure 1:
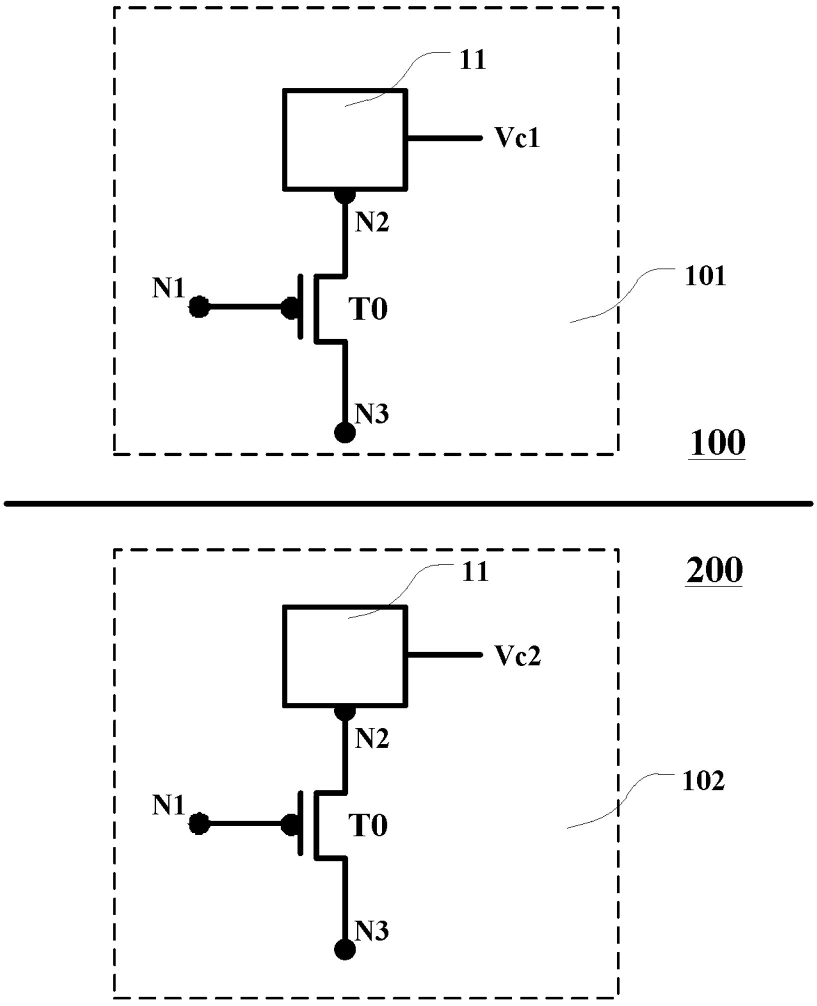
FIG. 1 is a schematic diagram of a display panel according to an embodiment of the present application.
Figure 2:
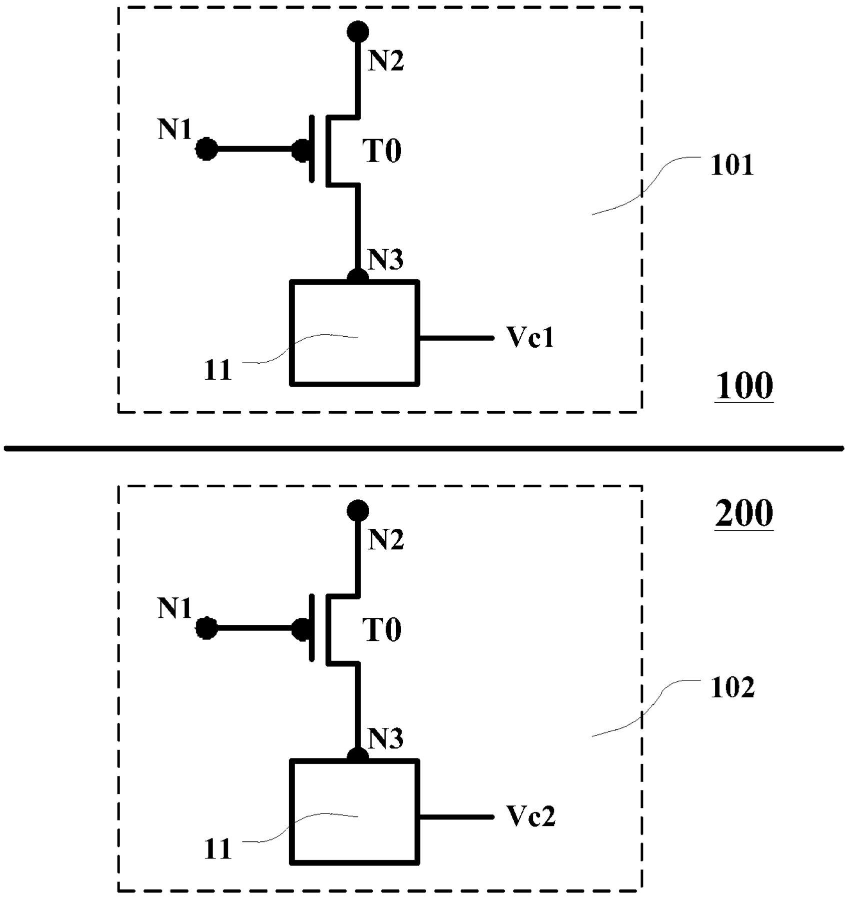
FIG. 2 is a schematic diagram of another display panel according to an embodiment of the present application.
Figure 3:
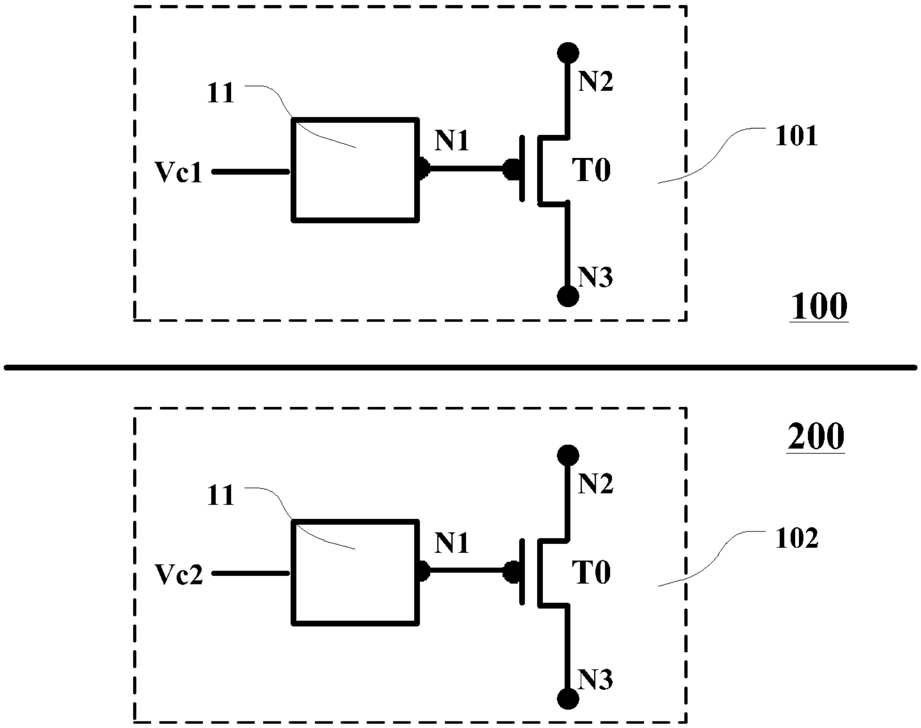
FIG. 3 is a schematic diagram of another display panel according to an embodiment of the present application.
Figure 4:
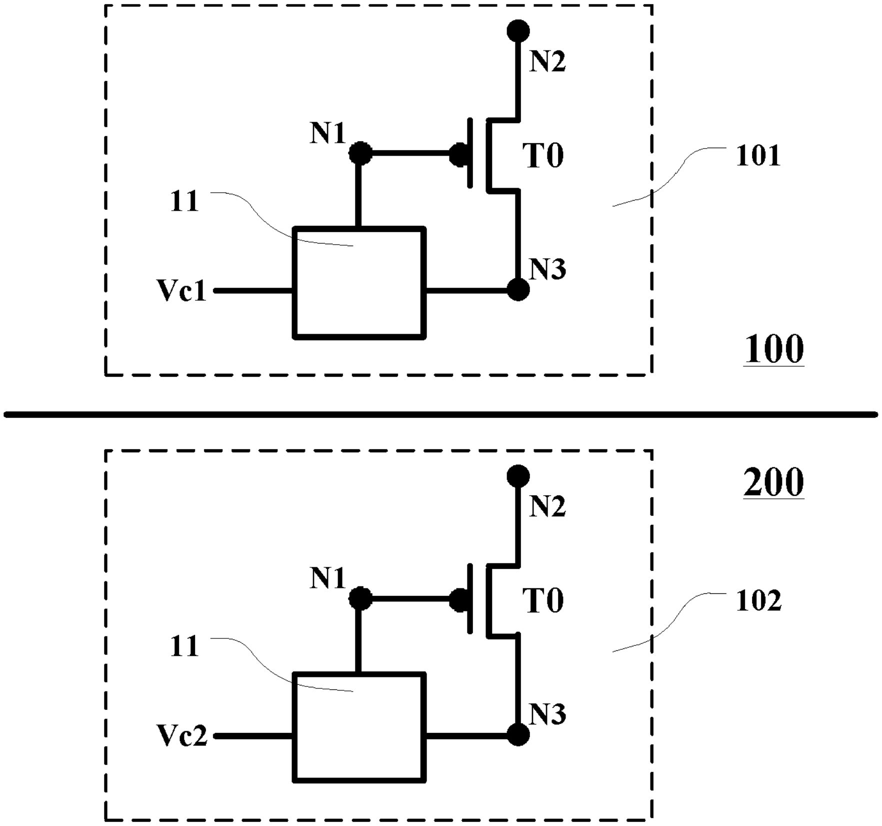
FIG. 4 is a schematic diagram of another display panel according to an embodiment of the present application.
Figure 5:
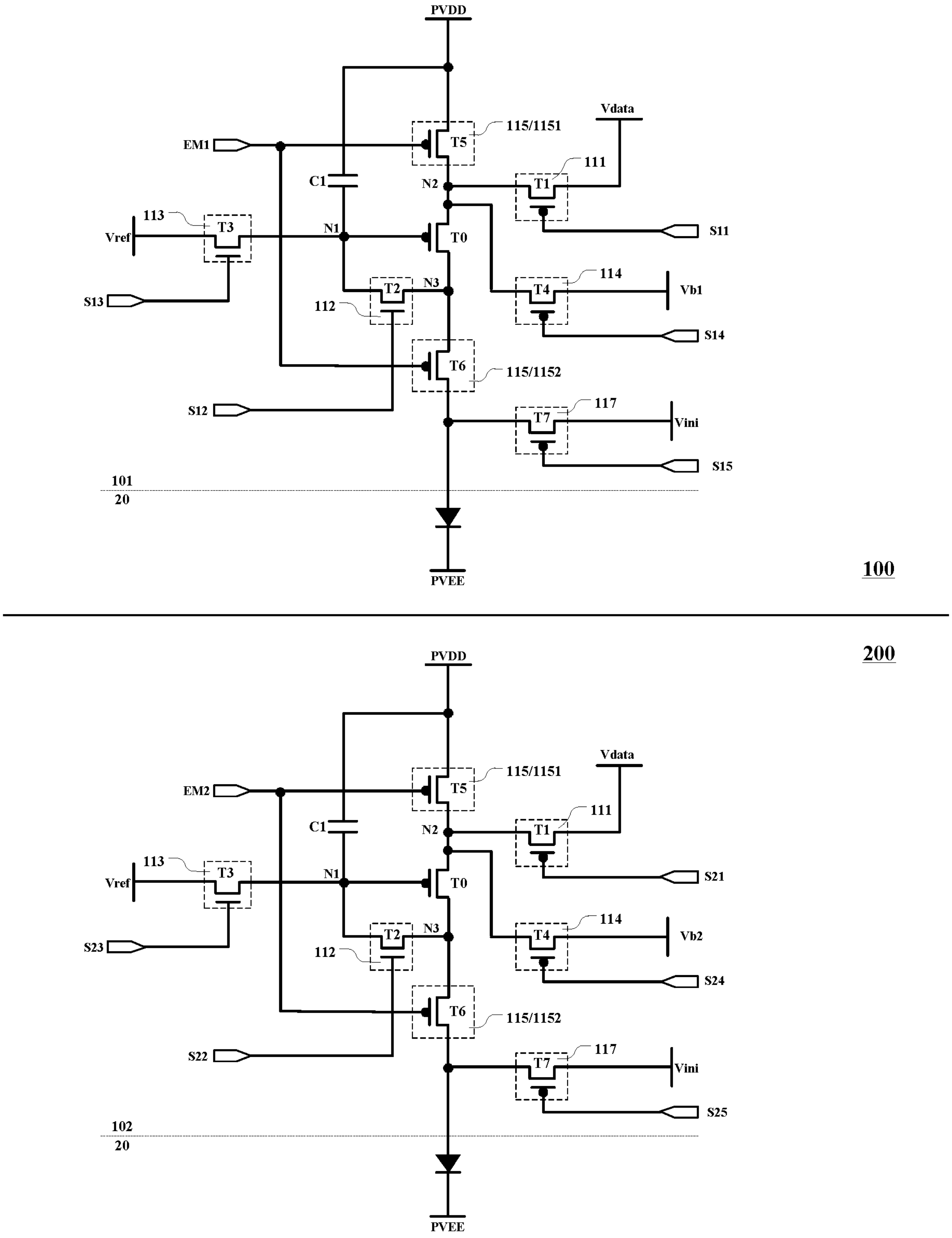
FIG. 5 is a schematic diagram of another display panel according to an embodiment of the present application.
Figure 6:
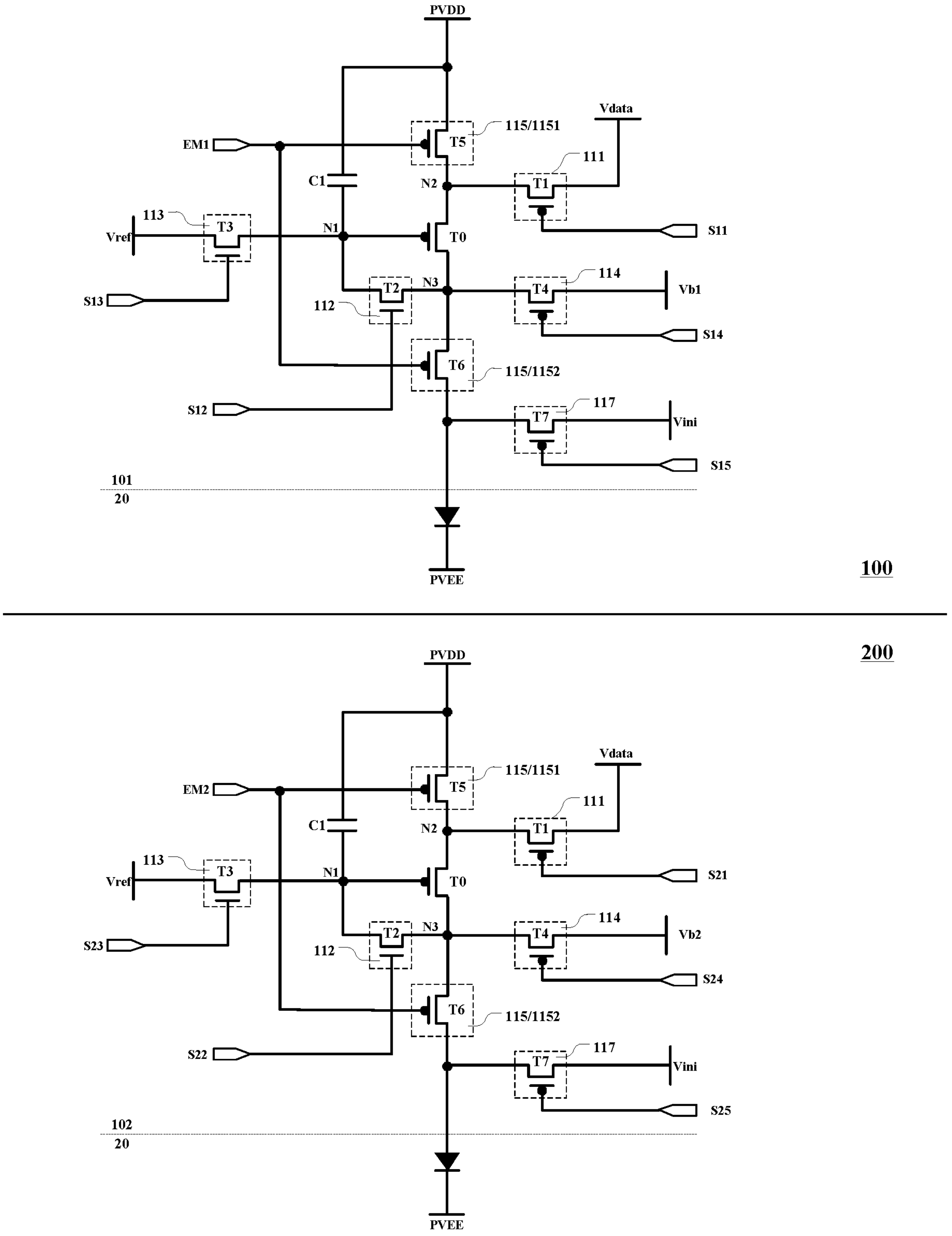
FIG. 6 is a schematic diagram of another display panel according to an embodiment of the present application.
Figure 7:
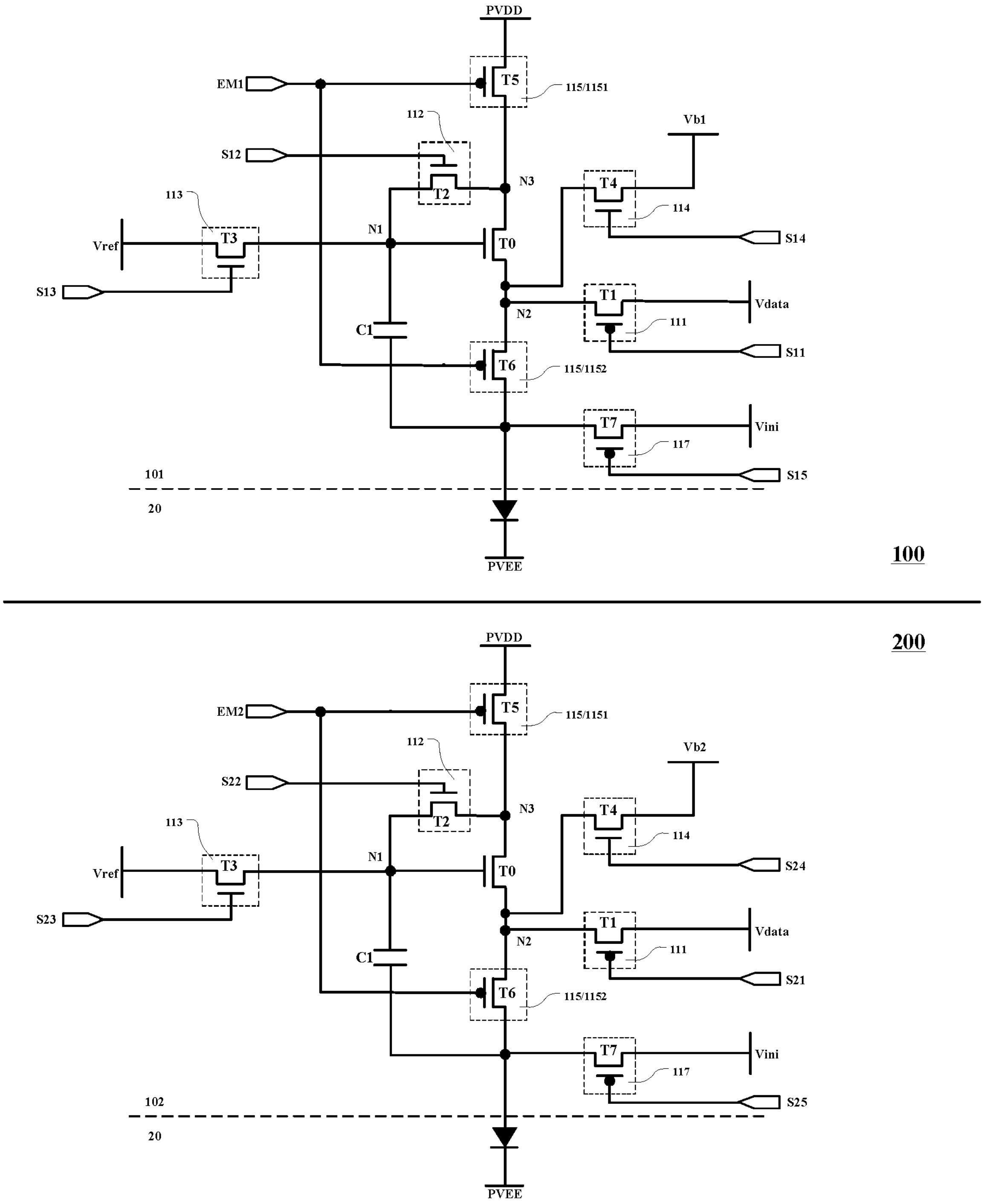
FIG. 7 is a schematic diagram of another display panel according to an embodiment of the present application.
Figure 8:
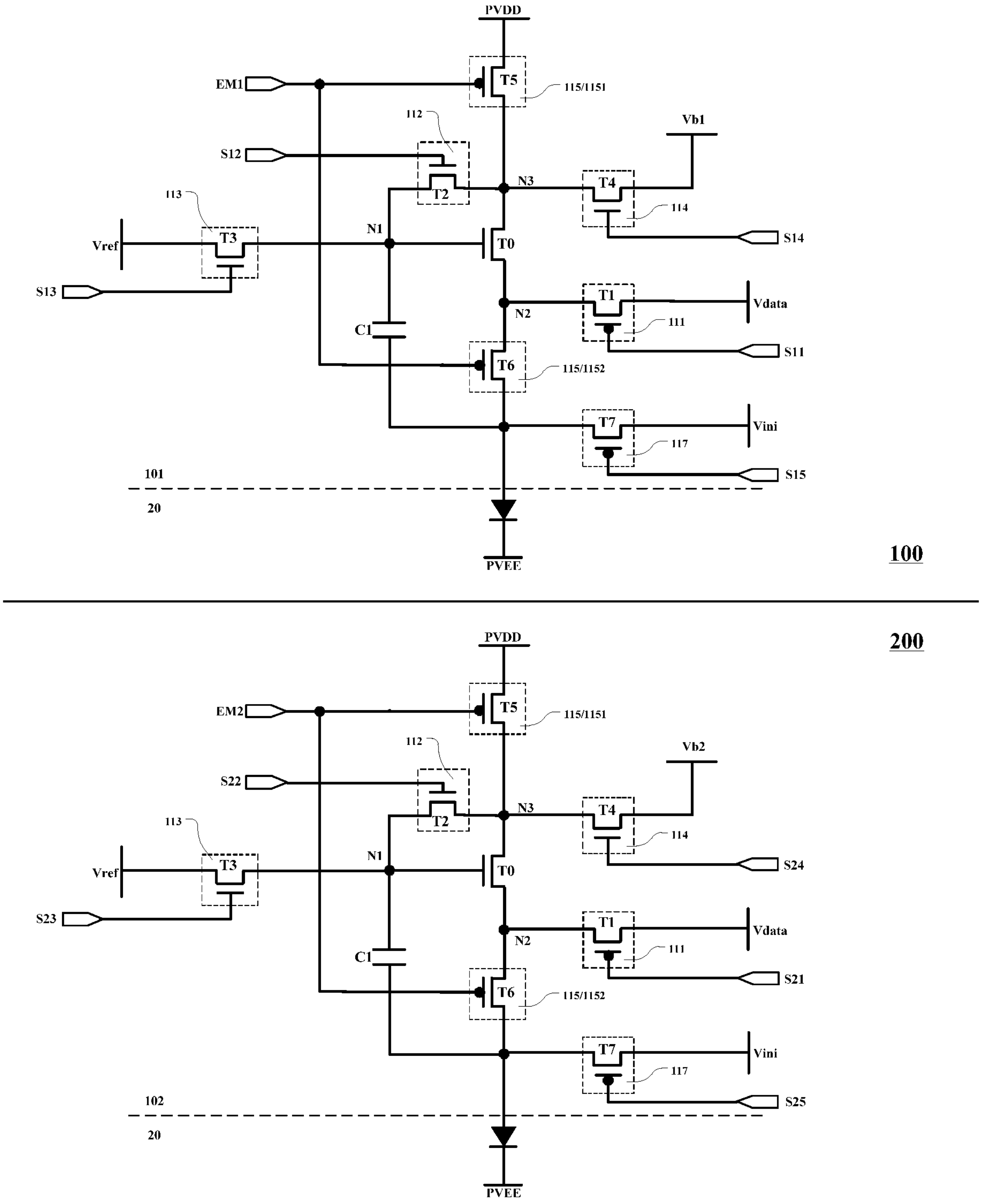
FIG. 8 is a schematic diagram of another display panel according to an embodiment of the present application.

Referring to FIGS. 1 to 8, FIG. 1 is a schematic diagram of a display panel according to an embodiment of the present application, FIG. 2 is a schematic diagram of another display panel according to an embodiment of the present application, FIG. 3 is a schematic diagram of another display panel according to an embodiment of the present application, FIG. 4 is a schematic diagram of another display panel according to an embodiment of the present application, FIG. 5 is a schematic diagram of another display panel according to an embodiment of the present application, FIG. 6 is a schematic diagram of another display panel according to an embodiment of the present application, FIG. 7 is a schematic diagram of another display panel according to an embodiment of the present application, and FIG. 8 is a schematic diagram of another display panel according to an embodiment of the present application. The display panel includes a first display region 100, a second display region 200, and a pixel circuit. The pixel circuit includes a first pixel circuit 101 and a second pixel circuit 102, where the first pixel circuit 101 is connected to a light-emitting element 20 in the first display region 100, and the second pixel circuit 102 is connected to a light-emitting element 20 in the second display region 200. The pixel circuit 10 includes a drive transistor T0 and a first presetting module 11, and a terminal of the first presetting module 11 is connected to the drive transistor T0, where a control terminal of a first presetting module 11 in the first pixel circuit 101 is configured to receive a first control signal Vc1, and a control terminal of a first presetting module 11 in the second pixel circuit 102 is configured to receive a second control signal Vc2. In at least one stage in a working process of the display panel, a pulse variation frequency of the first control signal Vc1 is F1, and a pulse variation frequency of the second control signal Vc2 is F2, where $F1 \neq F2$.

In this embodiment, the terminal of the first presetting module 11 is connected to the drive transistor T0. Optionally, as shown in FIG. 1, the terminal of the first presetting module 11 is connected to a first electrode of the drive transistor T0, that is, a node N2. In the first pixel circuit 101, the first presetting module 11 is controlled by the first control signal Vc1 to provide a signal for a first electrode of a drive transistor T0, and in the second pixel circuit 102, the first presetting module 11 is controlled by the second control signal Vc2 to provide a signal for a first electrode of a drive transistor T0. Optionally, as shown in FIG. 2, the terminal of the first presetting module 11 is connected to a second electrode of the drive transistor T0, that is, a node N3. In the first pixel circuit 101, the first presetting module 11 is controlled by the first control signal Vc1 to provide the signal for a second electrode of the drive transistor T0, and in the second pixel circuit 102, the first presetting module 11 is controlled by the second control signal Vc2 to provide the signal for a second electrode of the drive transistor T0. Optionally, as shown in FIG. 3, the terminal of the first presetting module 11 is connected to a gate of the drive transistor T0, that is, a node N1. In the first pixel circuit 101, the first presetting module 11 is controlled by the first control signal Vc1 to provide the signal for a gate of the drive transistor T0, and in the second pixel circuit 102, the first presetting module 11 is controlled by the second control signal Vc2 to provide the signal for a gate of the drive transistor T0. Optionally, as shown in FIG. 4, the terminal of the first presetting module 11 is connected to the gate of the drive transistor T0, that is, the N1 node, and the other terminal of the first presetting module 11 is connected to the first electrode of the drive transistor T0 or the second electrode of the drive transistor T0, that is, the N2 node or the N3 node. In the first pixel circuit 101, the first presetting module 11 is controlled by the first control signal Vc1 to selectively provide a signal path between the gate of the drive transistor T0 and the first electrode of the drive transistor T0 or the second electrode of the drive transistor T0, and in the second pixel circuit 102, the first presetting module 11 is controlled by the second control signal Vc2 to selectively provide a signal path between the gate of the drive transistor T0 and the first electrode of the drive transistor T0 or the second electrode of the drive transistor T0.

From the preceding description, the terminal of the first presetting module 11 is connected to the drive transistor T0 and configured to provide the signal for the gate of the drive transistor T0, the first electrode of the drive transistor T0, or the second electrode of the drive transistor T0. In this embodiment, based on different functional requirements for the first display region 100 and the second display region 200, a requirement for a frequency with which the first pixel circuit 101 receives a preset signal is also different from a requirement for a frequency with which the second pixel circuit 102 receives a preset signal. Thus, requirements for the pulse variation frequencies of the control signals of the first presetting modules 11 are different, that is, the pulse variation frequency F1 of the first control signal Vc1 is different from the pulse variation frequency F2 of the second control signal Vc2 so that the frequency with which the gate of the drive transistor T0, the first electrode of the drive transistor T0, or the second electrode of the drive transistor T0 in the first pixel circuit 101 receives the preset signal and the frequency with which the gate of the drive transistor T0, the first electrode of the drive transistor T0, or the second electrode of the drive transistor T0 in the second pixel circuit 102 receives the preset signal are separately managed and controlled, thereby implementing respective functions of the first display region 100 and the second display region 200.

In this embodiment, optionally, as shown in FIGS. 5 to 8, the first presetting module 11 is a data write module 111 connected to the first electrode of the drive transistor T0 and configured to provide a data signal Vdata for the drive transistor T0; or, the first presetting module 11 is a compensation module 112 connected between the gate of the drive transistor T0 and the second electrode of the drive transistor T0 and configured to compensate for a threshold voltage deviation of the drive transistor T0; or, the first presetting module 11 is a reset module 113 connected to the gate of the drive transistor T0 or the second electrode of the drive transistor T0 and configured to provide a reset signal Vref for the drive transistor T0; or, the first presetting module 11 is a bias adjustment module 114 connected to the first electrode of the drive transistor T0 or the second electrode of the drive transistor T0 and configured to provide a bias adjustment signal VO for the drive transistor T0.

It is to be noted that as shown in FIGS. 5 and 6, the drive transistor T0 is a P-type metal-oxide-semiconductor (PMOS) transistor, where the bias adjustment module 114 is connected to the first electrode of the drive transistor T0 in FIG. 5 and the bias adjustment module 114 is connected to the second electrode of the drive transistor T0 in FIG. 6. As shown in FIGS. 7 and 8, the drive transistor T0 is an N-type metal-oxide-semiconductor (NMOS) transistor, where the bias adjustment module 114 is connected to the first electrode of the drive transistor T0 in FIG. 7 and the bias adjustment module 114 is connected to the second electrode of the drive transistor T0 in FIG. 8. When the drive transistor T0 is the PMOS transistor, in a light emission stage, a signal applied to the gate of the drive transistor T0 is the data signal Vdata, a signal applied to the first electrode of the drive transistor T0 is a first power signal PVDD, and a signal of the second electrode of the drive transistor T0 may be a relatively low potential. In this case, the case may exist where potential of the gate of the drive transistor T0 is higher than potential of the second electrode of the drive transistor T0. In this case, the PMOS drive transistor T0 is on, and a reverse electric field may exist between the gate and the second electrode, which causes carriers in an active layer of the drive transistor T0 to be polarized. Thus, a threshold voltage drift of the drive transistor T0 is caused, thereby affecting the generation of a drive current. In order to improve this phenomenon, a bias adjustment signal with a relatively high level is input into the first electrode of the drive transistor T0 or the second electrode of the drive transistor T0 through the bias adjustment module 114 so that potential of the first electrode or the potential of the second electrode is higher than the potential of the gate, thereby counteracting the preceding threshold voltage drift problem. When the drive transistor T0 is the NMOS transistor, the case is similar. In the light emission stage, the case may exit where the potential of the gate of the NMOS drive transistor T0 is lower than the potential of the second electrode of the NMOS drive transistor T0, the reverse electric field is formed in this case, and therefore, the threshold voltage drift of the drive transistor T0 is caused. Therefore, a bias adjustment signal with a relatively low level is input into the first electrode of the drive transistor T0 or the second electrode of the drive transistor T0 through the bias adjustment module 114 so that the potential of the first electrode or the potential of the second electrode is lower than the potential of the gate, thereby counteracting the preceding threshold voltage drift problem.

In this embodiment, in some cases, the functional requirements for the first display region 100 and the second display region 200 are embodied in different data refresh rates. For example, the first display region 100 is a region where images of a movie, a game, or the like are displayed, and a relatively high data refresh rate is required so as to ensure that the images are refreshed fast and improve user experience while the second display region 200 is a region where characters, time information, or the like are displayed, the relatively high data refresh rate is not required, and the requirements can be satisfied with a relatively low data refresh rate. In this case, a frequency with which the first pixel circuit 101 receives the data signal is different from a frequency with which the second pixel circuit 102 receives the data signal. Then, to achieve this object, control signals of modules which are in the first pixel circuit 101 and the second pixel circuit 102 and related to data signal input paths are designed to have different frequencies.

The preceding module on a data signal input path may be the data write module 111, where one terminal of the data write module 111 is connected to a data signal terminal and configured to receive the data signal Vdata, and the other terminal of the data write module 111 is connected to the first electrode of the drive transistor T0 and configured to provide the data signal Vdata for the first electrode of the drive transistor T0. Therefore, if the first presetting module 11 is the data write module 111, the pulse variation frequencies of the first control signal Vc1 and the second control signal Vc2 are caused to be different so that the data refresh rates of the first display region 100 and the second display region 200 can be controlled to be different. Referring to FIGS. 5 to 8, when the first presetting module 11 is the data write module 111, a control signal S11 of a data write module 111 in the first pixel circuit 101 is the first control signal Vc1, and a control signal S21 of a data write module 111 in the second pixel circuit 102 is the second control signal Vc2. Optionally, the data write module 111 includes a data write transistor T1, where a gate of a data write transistor T1 in the first pixel circuit 101 receives the control signal S11, that is, the first control signal Vc1, and agate of a data write transistor T1 in the second pixel circuit 102 receives the control signal S21, that is, the second control signal Vc2.

In addition, the preceding module on the data signal input path may also be the compensation module 112, where one terminal of the compensation module 112 is connected to the gate of the drive transistor T0, the other terminal of the compensation module 112 is connected to the second electrode of the drive transistor T0, and the compensation module 122 is configured to compensate for the threshold voltage deviation of the drive transistor T0. The data signal Vdata needs to be input into the gate of the drive transistor T0 such that the drive current can be generated. Therefore, after the data signal Vdata is input into the first electrode of the drive transistor T0 through the data write module 111, the data signal Vdata is input into the second electrode of the drive transistor T0 through the drive transistor T0 and then input into the gate of the drive transistor T0 through the compensation module 112. Therefore, if the first presetting module 11 is the compensation module 112, the pulse variation frequencies of the first control signal Vc1 and the second control signal Vc2 are caused to be different so that the data refresh rates of the first display region 100 and the second display region 200 can be controlled to be different. Referring to FIGS. 5 to 8, when the first presetting module 11 is the compensation module 112, a control signal S12 of a compensation module 112 in the first pixel circuit 101 is the first control signal Vc1, and a control signal S22 of a compensation module 112 in the second pixel circuit 102 is the second control signal Vc2. Optionally, the compensation module 112 includes a compensation transistor T2, where a gate of a compensation transistor T2 in the first pixel circuit 101 receives the control signal S21, that is, the first control signal Vc1, and a gate of a compensation transistor T2 in the second pixel circuit 102 receives the control signal S22, that is, the second control signal Vc2.

In addition, in a working process of the pixel circuit, a data write stage often needs to be accompanied by a reset stage. The reason is that the gate of the drive transistor T0 generally needs to be reset before the data signal Vdata is written into the gate of the drive transistor T0, and a data signal of a previous frame is reset to fixed potential and then the data signal Vdata is written. Thus, the data signal of the previous frame is prevented from interfering with a data signal Vdata of a current frame. Therefore, generally, for a frame into which the data signal does not need to be written, the reset stage is not required, either. Therefore, the first presetting module 11 may also be the reset module 113, where one terminal of the reset module 113 is connected to the gate of the drive transistor T0 or the second electrode of the drive transistor T0, the other terminal of the reset module 113 is connected to a reset signal terminal, and the reset module 113 is configured to provide the reset signal Vref for the drive transistor T0. In this case, the pulse variation frequencies of the first control signal Vc1 and the second control signal Vc2 are caused to be different so that reset frequencies of the first display region 100 and the second display region 200 can be controlled to be different, thereby suiting the requirement for the first display region 100 and the second display region 200 to have the different data refresh rates. Referring to FIGS. 5 to 8, when the first presetting module 11 is the reset module 113, a control signal S13 of a reset module 113 in the first pixel circuit 101 is the first control signal Vc1, and a control signal S23 of a reset module 113 in the second pixel circuit 102 is the second control signal Vc2. Optionally, the reset module 113 includes a reset transistor T3, where a gate of a reset transistor T3 in the first pixel circuit 101 receives the control signal S13, that is, the first control signal Vc1, and a gate of a reset transistor T3 in the second pixel circuit 102 receives the control signal S23, that is, the second control signal Vc2.

In some other cases, the first presetting module 11 may also be the bias adjustment module 114. The data refresh rates of the first pixel circuit 101 and the second pixel circuit 102 are different. Therefore, as described above, the different data refresh rates may result in different signal variation frequencies of the gate of the drive transistor T0 in different light emission stages. A bias degree of the drive transistor T0 is related to the potential of the gate of the drive transistor TO. Therefore, a bias of the first pixel circuit 101 may be different from a bias of the second pixel circuit 102. Based on this, a frequency with which a bias adjustment signal is input into the first pixel circuit 101 may also be different from a frequency with which a bias adjustment signal is input into the second pixel circuit 102, and therefore, the first presetting module 11 may be the bias adjustment module 114. In this case, referring to FIGS. 5 to 8, a control signal S14 of a bias adjustment module 114 in the first pixel circuit 101 is the first control signal Vc1, and a control signal S24 of a bias adjustment module 114 in the second pixel circuit 102 is the second control signal Vc2. Optionally, the bias adjustment module 114 includes a bias adjustment transistor T4, where a gate of a bias adjustment transistor T4 in the first pixel circuit 101 receives the control signal S14, that is, the first control signal Vc1, and a gate of a bias adjustment transistor T4 in the second pixel circuit 102 receives the control signal S24, that is, the second control signal Vc2.

Optionally, in this embodiment, in the at least one stage in the working process of the display panel, a data refresh rate of the first pixel circuit 101 is higher than a data refresh rate of the second pixel circuit 102, where F1>F2 when the first presetting module 11 is the data write module 111, the compensation module 112, or the reset module 113, or F1>F2 or F1≤F2 when the first presetting module 11 is the bias adjustment module 114.

In the display panel, generally, a frame refresh rate is a variation frequency of a subframe as a minimum unit for refreshing an image, and the data refresh rate refers to the frequency with which the data signal Vdata is written into the gate of the drive transistor T0. A panel having a frame refresh rate of 120 Hz is used as an example for illustration. The data refresh rate is 60 Hz, which indicates that one data refresh period includes one data write frame and one retention frame. The data write frame refers to a subframe in which the data signal Vdata is written into the gate of the drive transistor T0, and the retention frame refers to a subframe in which no data signal Vdata is written into the gate of the drive transistor T0. The data refresh rate is 30 Hz, which indicates that one data refresh period includes one data write frame and three retention frames, and so on. The data refresh rate of the first pixel circuit 101 is higher than the data refresh rate of the second pixel circuit 102, for example, the data refresh rate of the first pixel circuit 101 is 60 Hz, and the data refresh rate of the second pixel circuit 102 is 30 Hz, or the like, which is only an example for the illustration. In other cases, the data refresh rate of the first pixel circuit 101 and the data refresh rate of the second pixel circuit 102 may be set according to actual requirements.

From the preceding description, the data write module 111 and the compensation module 112 are on the path where the data signal Vdata is input into the gate of the drive transistor TO. Therefore, when the first presetting module 11 is the data write module 111 or the compensation module 112, the data refresh rate of the first pixel circuit 101 is higher than the data refresh rate of the second pixel circuit 102, and F1>F2. That is, a frequency with which the module controlling the transmission of the data signal Vdata on the first pixel circuit 101 is turned on and off is higher than a frequency with which the module controlling the transmission of the data signal Vdata on the second pixel circuit 102 is turned on and off. Thus, it can be implemented that the data refresh rate of the first pixel circuit 101 is higher than the data refresh rate of the second pixel circuit 102.

In addition, as described above, the reset stage is often generated along with the data write stage. Therefore, when the first presetting module 11 is the reset module 113, the data refresh rate of the first pixel circuit 101 is higher than the data refresh rate of the second pixel circuit 102, and F1>F2. That is, in the pixel circuit having the high data refresh rate, a frequency with which the reset module 113 is turned on and off is also relatively high.

In addition, when the first presetting module 11 is the bias adjustment module 114, the case is different from the preceding cases to a certain extent. The bias adjustment module 114 is neither on the path where the data signal Vdata is input into the gate of the drive transistor T0 nor on the path where the reset signal Vref is written, that is, the bias adjustment module 114 is not configured to control the data refresh rate. Therefore, when the data refresh rate of the first pixel circuit 101 is higher than the data refresh rate of the second pixel circuit 102, the frequency with which the bias adjustment module 114 is turned on and off needs to be designed according to the function of the bias adjustment module 114. In some cases, the data refresh rate is higher, which indicates that the potential of the gate of the drive transistor T0 has a higher variation frequency. As described above, the bias problem of the drive transistor T0 is closely related to the potential of the gate of the drive transistor T0 in the light emission stage. When the potential of the gate of the drive transistor T0 has a relatively high variation frequency, the drive transistor T0 does not have the same reverse electric field for a long time, that is, the drive transistor T0 does not have the same bias problem for a long time. When the potential of the gate of the drive transistor T0 has a relatively low variation frequency, the bias problem may exist for a relatively long time if the bias problem occurs. Therefore, when the data refresh rate of the pixel circuit is relatively low, the bias problem may become more serious. In order to solve this problem, a bias adjustment stage may need to be performed with a higher frequency, and the bias problem is corrected through multiple bias adjustments. When the data refresh rate of the pixel circuit is relatively high, the bias problem is relatively gentle, and the frequency of the bias adjustment stage may be appropriately low. Therefore, in this case, the case may exist where $F1 \leq F2$. Of course, in some other cases, for example, when the data refresh rate of the first pixel circuit 101 and the data refresh rate of the second pixel circuit 102 are both relatively low but the data refresh rate of the first pixel circuit 101 is relatively high, both the first pixel circuit 101 and the second pixel circuit 102 require multiple bias adjustment stages to correct the bias problems of the drive transistors TO; and the first display region 100 corresponding to the first pixel circuit 101 is required to have a better display effect. In these cases, the case may also exist where $F1>F2$.

Figure 9:
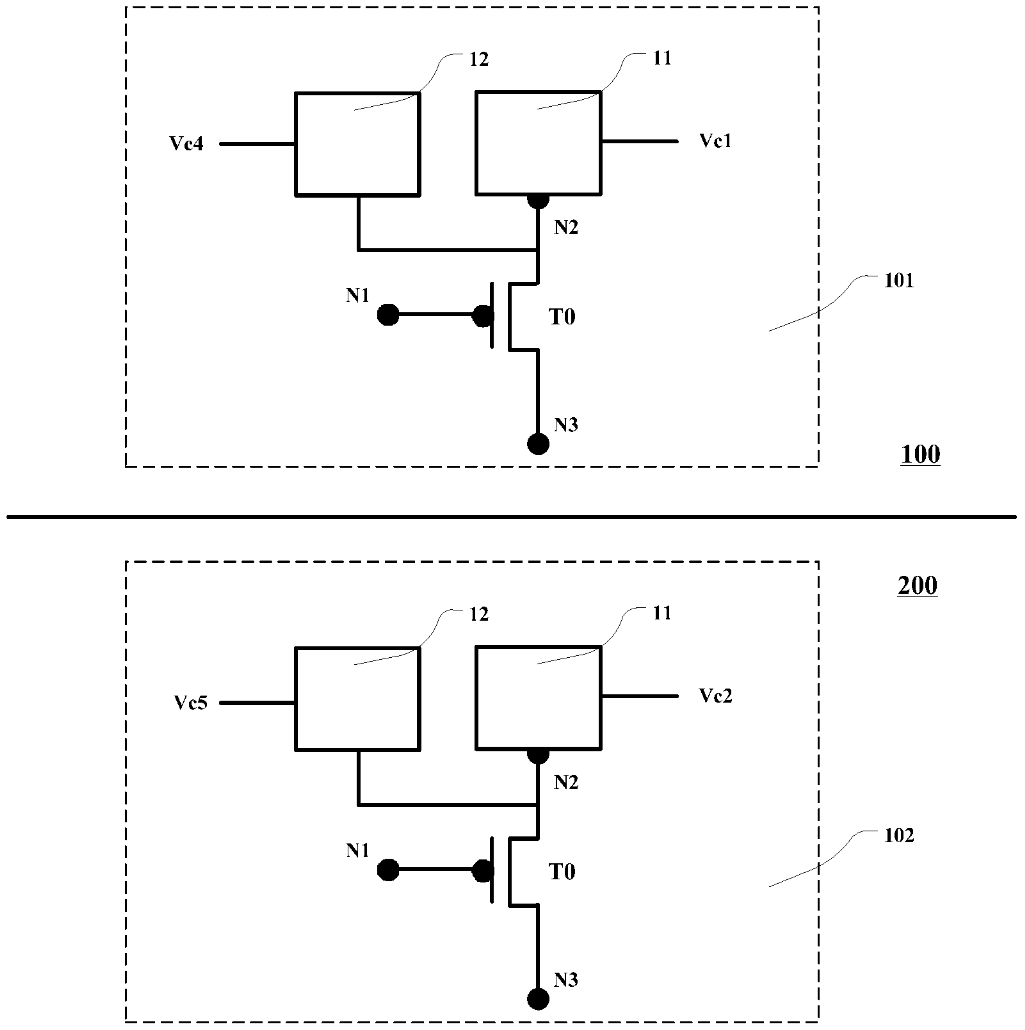
FIG. 9 is a schematic diagram of another display panel according to an embodiment of the present application.

In this embodiment, optionally, referring to FIG. 9 which is a schematic diagram of another display panel according to an embodiment of the present application, the pixel circuit further includes a second presetting module 12, where a control terminal of a second presetting module 12 in the first pixel circuit 101 is configured to receive a fourth control signal Vc4, and a control terminal of a second presetting module 12 in the second pixel circuit 102 is configured to receive a fifth control signal Vc5. In the at least one stage of the working process of the display panel, a pulse variation frequency of the fourth control signal Vc4 is F4, and a pulse variation frequency of the fifth control signal Vc5 is F5, where $|F1-F2|>|F4-F5|\geq 0$.

In the display panel, the data write module 111 and the compensation module 112 on the path where the data signal Vdata is written into the gate of the drive transistor T0 and the reset module 113 which is configured to provide the reset signal Vref for the gate of the drive transistor TO are all closely related to the variation of the data refresh rate. Therefore, these modules may all be referred to as the first presetting module 11. When the data refresh rate of the first pixel circuit 101 is different from the data refresh rate of the second pixel circuit 102, the pulse variation frequency of the first control signal Vc1 is F1, the pulse variation frequency of the second control signal Vc2 is F2, and the difference between F1 and F2 represents the difference in the data refresh rate between the first pixel circuit 101 and the second pixel circuit 102. The pixel circuit also often includes some modules which are not related to the variation of the data refresh rate. Turning on and off these modules are not necessarily limited by the data refresh rate, that is, this type of module is the second presetting module 12. In some cases, as long as the pixel circuit refreshes the subframe, the second presetting module 12 needs to be turned on and off. In this case, a frequency with which the second presetting module 12 in the first pixel circuit 101 is turned on and off may be the same as a frequency with which the second presetting module 12 in the first pixel circuit 101 is turned on and off, that is, the pulse variation frequency F4 of the fourth control signal is equal to the pulse variation frequency F5 of the fifth control signal. In some other cases, the frequency with which the second presetting module 12 in the first pixel circuit 101 is turned on and off may be different from the frequency with which the second presetting module 12 in the second pixel circuit 102 is turned on and off. However, a small difference may exist, which may not be set completely according to the difference in the data refresh rate. In this case, the case may exist where F4 is not equal to F5, but$|F1-F2|>|F4-F5|$. Therefore, generally, $|F1-F2|>|F4-F5|\geq 0$.

It is to be noted that FIG. 9 only schematically shows a connection manner of the second presetting module 12, and it should not be understood as the second presetting module 12 only capable of being connected to the N2 node. In other embodiments, the second presetting module 12 may also be connected to the N1 node, the N3 node, the light-emitting element, or other positions.

Optionally, referring to FIGS. 5 to 8, the second presetting module 12 may be a light emission control module 115 connected between a first power signal terminal and the drive transistor T0 or between the drive transistor T0 and the light-emitting element 20 and configured to selectively allow the light-emitting element 20 to enter the light emission stage. Optionally, the light emission control module 115 includes a first light emission control module 1151 and a second light emission control module 1152, where the first light emission control module 1151 is connected between the first power signal terminal and the first electrode (as shown in FIGS. 5 and 6) of the drive transistor T0 or the second electrode (as shown in FIGS. 7 and 8) of the drive transistor T0 and configured to provide a first power signal Vdata for the drive transistor T0, and the second light emission control module 1152 is connected between the first electrode (as shown in FIGS. 7 and 8) of the drive transistor T0 or the second electrode (as shown in FIGS. 5 and 6) of the drive transistor T0 and the light-emitting element 20 and configured to selectively allow the drive current to enter the light-emitting element 20. Turning on and off the light emission control module 115 control the light-emitting element to emit light or not, and the process where the light-emitting element is turned on and off exists in a period of one subframe. Therefore, generally, turning on and off the light emission control module 115 need to remain consistent with a frequency of the subframe, and therefore, a frequency variation of a control signal of the light emission control module 115 is different from the variation of the data refresh rate. In this embodiment, in the first pixel circuit 101, a control signal of a light emission control module 115 is EM1, that is, the fourth control signal Vc4, and in the second pixel circuit 102, a control signal of a light emission control module 115 is EM2, that is, the fifth control signal Vc5. Optionally, the first light emission control module 1151 includes a first light emission control transistor T5, and the second light emission control module 1152 includes a second light emission control transistor T6, where in the first pixel circuit 101, a gate of a first light emission control transistor T5 and a gate of a second light emission control transistor T6 are configured to receive the control signal EM1, that is, the fourth control signal Vc4, and in the second pixel circuit 102, a gate of a first light emission control transistor T5 and a gate of a second light emission control transistor T6 are configured to receive the control signal EM2, that is, the fifth control signal Vc5.

Optionally, the second presetting module 12 may also be an initialization module 117, where one terminal of the initialization module 117 is connected to an initialization signal terminal and the other terminal of the initialization module 117 is connected to the light-emitting element 20, and the initialization module 117 is configured to provide an initialization signal Vini for the light-emitting element 20. After the light-emitting element 20 finishes emitting light in the previous frame, information about a drive current of the previous frame is generally still reserved. Therefore, the initialization signal Vini needs to be applied to the light-emitting element 20 to initialize the information about the drive current of the previous frame, and then a drive current of the current frame is written. Therefore, turning on and off the initialization module 117 also have no direct correspondence with the data refresh rate. In some cases, when the display panel passes through one light emission stage, and one initialization stage needs to be performed. Therefore, the difference between pulse variation frequencies of the control signals of the initialization modules 117 in the first pixel circuit 101 and the second pixel circuit 102 is different from the difference in the data refresh rate. In this case, a control signal S15 of an initialization module 117 in the first pixel circuit 101 is the fourth control signal Vc4, and a control signal S25 of an initialization module 117 in the second pixel circuit 102 is the fifth control signal Vc5. Optionally, the initialization module 117 includes an initialization transistor T7, where a gate of an initialization transistor T7 in the first pixel circuit 101 receives the control signal S15, that is, the fourth control signal Vc4, and a gate of an initialization transistor T7 in the second pixel circuit 102 receives the control signal S25, that is, the fifth control signal Vc5.

In addition, optionally, in some embodiments, the second presetting module 12 may also be the bias adjustment module 114, where the bias adjustment module 114 is connected to the first electrode of the drive transistor T0 or the second electrode of the drive transistor T0 and configured to provide the bias adjustment signal for the drive transistor T0. The bias adjustment module 114 is not directly on the path where the data signal Vdata is written or the path where the reset signal Vref is written. Therefore, the variation of a frequency with which the bias adjustment module 114 is turned on and off may be different from the variation of the data refresh rate. Therefore, the bias adjustment module 114 may also be the second presetting module 12. Since the bias adjustment module 114 is mainly configured to provide the bias adjustment signal for the drive transistor T0, in some cases, the bias adjustment stage needs to be performed once a frame is finished so that the bias problem of the drive transistor T0 is corrected in time. In this case, the control signal S14 of the bias adjustment module 114 in the first pixel circuit 101 is the fourth control signal Vc4, and the control signal S24 of the bias adjustment module 114 in the second pixel circuit 102 is the fifth control signal Vc5. Optionally, the bias adjustment module 114 includes the bias adjustment transistor T4, where the gate of the bias adjustment transistor T4 in the first pixel circuit 101 receives the control signal S14, that is, the fourth control signal Vc4, and the gate of the bias adjustment transistor T4 in the second pixel circuit 102 receives the control signal S24, that is, the fifth control signal Vc5.

Optionally, in this embodiment, $(F1-F2)\times(F4-F5)\geq 0$. As described above, F1 may determine the data refresh rate of the first pixel circuit 101, F2 may determine the data refresh rate of the second pixel circuit 102, and F4 and F5 may not have a close relationship with the data refresh rate. In this case, the case may exist where F4=F5, that is, the frequency with which the second presetting module 12 is turned on and off in the first pixel circuit 101 remains consistent with the frequency with which the second presetting module 12 is turned on and off in the second pixel circuit 102. In this case, $(F1-F2)\times(F4-F5)=0$. In other cases, some cases may exist where when the data refresh rate of the first pixel circuit 101 is different from the data refresh rate of the second pixel circuit 102, the frequency with which the second presetting module 12 is turned on and off also varies correspondingly, but amplitude of the variation is not as large as the amplitude between F1 and F2. For example, the data refresh rate of the second pixel circuit 102 is relatively low, and then for one data refresh period, because the data signal remains unvaried, that is, the drive current remains unvaried, correspondingly, a variation frequency of the initialization module 117 may be appropriately reduced, and a refresh may be performed again after multiple frames. Therefore, in this case, the case may occur where F4>F5, and $(F1-F2)\times(F4-F5)>0$.

In some particular cases, the case may also exist where $(F1-F2)\times(F4-F5)<0$. For example, when the second presetting module 12 is the bias adjustment module 114, as described above, the case may exist where when the first pixel circuit 101 has the relatively high data refresh rate while the second pixel circuit 102 has the relatively low data refresh rate, in order to prevent the second pixel circuit 102 from remaining in the same bias state for a long time, a relatively high-frequency bias adjustment may need to be performed on the second pixel circuit 102 in which data is refreshed with a low frequency so that the bias problem of the second pixel circuit 102 can be sufficiently adjusted. In this case, the case may exist where F4<F5 such that $(F1-F2)\times(F4-F5)<0$.

Figure 10:
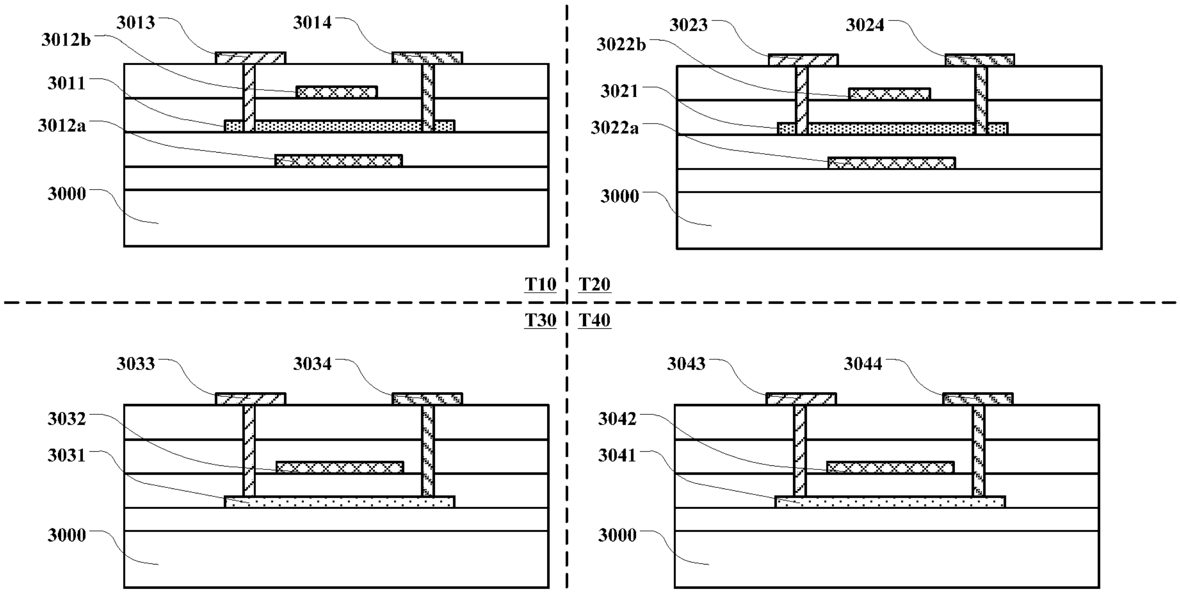
FIG. 10 is a schematic diagram showing comparisons between transistors according to an embodiment of the present application.

Optionally, in this embodiment, referring to FIG. 10 which is a schematic diagram showing comparisons between transistors according to an embodiment of the present application, on a base substrate 3000, the first presetting module 11 in the first pixel circuit 101 includes a first transistor T10, the first presetting module 11 in the second pixel circuit 102 includes a second transistor T20, and an active layer of the first transistor T10 and an active layer of the second transistor T20 each include an oxide semiconductor, where the first transistor T10 includes the active layer 3011, a gate **3012*a* and/or a gate 3012*b*, a source 3013, and a drain 3014, and the active layer 3011 includes the oxide semiconductor, and the second transistor T20 includes the active layer 3021, a gate 3022*a* and/or a gate 3022*b*, a source 3023, and a drain 3024, and the active layer 3021 includes the oxide semiconductor. It is to be noted that the gate 3012*a* in the first transistor T10 may be a bottom gate, and the gate 3012*b* in the first transistor T10 may be a top gate. The stability of the first transistor T10 is improved through the design of the top and bottom gates. Similarly, the gate 3022*a* in the second transistor T20 may be a bottom gate and the gate 3022*b* in the second transistor T20 may be a top gate, thereby improving the stability of the second transistor T20. The second presetting module 12 in the first pixel circuit 101 includes a third transistor T30, and the second presetting module 12 in the second pixel circuit 102 includes a fourth transistor T40, where an active layer of the third transistor T30 and an active layer of the fourth transistor T40 each include silicon. The third transistor T30 includes an active layer 3031, a gate 3032, a source 3033, and a drain 3034, and the fourth transistor T40 includes an active layer 3041, a gate 3042, a source 3043, and a drain 3044**.

The oxide semiconductor transistor has the advantage of having a small leakage current. Therefore, in the pixel circuit, a transistor connected to the drive transistor T0, in particular, a transistor connected to the gate of the drive transistor T0, is preferably the oxide semiconductor transistor. The gate of the drive transistor T0 has the function of storing the data signal Vdata, and the generation of the drive current is closely related to the data signal Vdata. Therefore, the potential stability of the gate of the drive transistor T0 directly affects the stability of the drive current, and therefore, the oxide semiconductor transistor having the relatively small leakage current is selected to be connected to the gate of the drive transistor T0, thereby sufficiently ensuring the potential stability of the gate of the drive transistor T0 in the light emission stage. In this embodiment, one terminal of the first presetting module 11 is connected to the drive transistor TO, and the first presetting module 11 is generally on the path where the data signal Vdata is written or the path where the reset signal Vref is written, which requires the first presetting module 11 to have a relatively small off-state leakage current, thereby ensuring the potential stability of the drive transistor T0. Therefore, it is preferable that the first presetting module 11 in the first pixel circuit 101 and the first presetting module 11 in the second pixel circuit 102 each include the oxide semiconductor transistor. However, the second presetting module 12 is not directly on the path where the data signal Vdata is input or the path where the reset signal Vref is input, the second presetting module 12 is not directly connected to the gate of the drive transistor T0, and it is more necessary for the second presetting module 12 to have a relatively fast response speed. Therefore, a silicon transistor with a relatively fast response speed is generally used.

Optionally, in this embodiment, as shown in FIGS. 5 to 8, the pixel circuit includes the bias adjustment module 114 connected to the first electrode of the drive transistor T0 or the second electrode of the drive transistor T0 and configured to provide the bias adjustment signal for the drive transistor T0, where a bias adjustment module in the first pixel circuit 101 is configured to receive a first bias adjustment signal Vb1 and a bias adjustment module in the second pixel circuit 102 is configured to receive a second bias adjustment signal Vb2.

In some embodiments, when F1≠F2, Vb1=Vb2, that is, the data refresh rate of the first pixel circuit 101 is different from the data refresh rate of the second pixel circuit 102, but the bias adjustment signal Vb1 received by the first pixel circuit 101 is the same as the bias adjustment signal Vb2 received by the second pixel circuit 102. When the data refresh rate of the first pixel circuit 101 and the data refresh rate of the second pixel circuit 102 are not significantly different and a difference in the bias problem is not significant, an adjustment may be performed with the same bias adjustment signal, thereby facilitating the simplification of a panel process.

In some other embodiments, when F1≠F2, Vb1=Vb2, that is, the data refresh rate of the first pixel circuit 101 is different from the data refresh rate of the second pixel circuit 102, and the bias adjustment signals respectively received by the first pixel circuit 101 and the second pixel circuit 102 are also different. In some cases, when the difference in the data refresh rate between the first pixel circuit 101 and the second pixel circuit 102 is relatively significant and the difference in the bias problem is relatively significant, or a requirement for an effect of correcting the bias problem of the first pixel circuit 101 is different from a requirement for an effect of correcting the bias problem of the second pixel circuit 102, relatively appropriate bias adjustment signals are respectively selected for the first pixel circuit 101 and the second pixel circuit 102, thereby ensuring respective display functions of the first display region 100 and the second display region 200.

Optionally, in some embodiments, F1>F2 and Vb1<Vb2, or F1<F2 and Vb1>Vb2, that is, (F1−F2)× (Vb1−Vb2)<0, and the variation of the data refresh rate is negatively correlated with the variation of a voltage value of the bias adjustment signal. In the case where the drive transistor T0 is the PMOS transistor, the potential of the gate may be higher than the potential of the second electrode in the light emission stage, which mainly causes the bias problem of the drive transistor T0. Therefore, in order to counteract the bias problem, the bias adjustment signal is often relatively high potential. When the data refresh rate is relatively low, a light emission stage for the same data signal remains for a relatively long time, and therefore, the bias problem is relatively serious. In this case, in order to sufficiently counteract the bias problem in a relatively short time, a higher bias adjustment signal may be needed so that when the data refresh rate is low, the bias adjustment signal is high. Thus, the case may occur where F1>F2 and Vb1<Vb2, or the case may occur where F1<F2 and Vb1>Vb2, that is, (F1−F2)× (Vb1−Vb2)<0. Of course, when the drive transistor T0 is the PMOS transistor, in some other cases, the case may also occur where (F1−F2)× (Vb1−Vb2)>0, that is, the variation of the data refresh rate is positively correlated with the variation of the voltage value of the bias adjustment signal. For example, when the first pixel circuit 101 has the high data refresh rate and the second pixel circuit 102 has the low data refresh rate, images with a high refresh rate are displayed in the first display region 100 and relatively static images are displayed in the second display region 200. Therefore, a requirement for reducing the bias problem of the first pixel circuit 101 is much higher than a requirement for reducing the bias problem of the second pixel circuit 102. The bias problem is reduced or not, which affects problems such as flickers and unstable brightness in a grayscale variation process. In this case, the case may exist where a relatively high bias adjustment signal is provided for the first pixel circuit 101 to ensure that the bias problem is sufficiently reduced while a relatively low bias adjustment signal is provided for the second pixel circuit 102 as long as display requirements for a relatively static second display region 200 are satisfied.

When the drive transistor T0 is the NMOS transistor, the potential of the gate may be lower than the potential of the second electrode in the light emission stage, which mainly causes the bias problem of the drive transistor T0. In this case, the bias adjustment signal with the relatively low level needs to be provided for the drive transistor T0 so as to counteract the bias problem. When the data refresh rate is lower, a light emission stage of the drive transistor T0 for the same data signal remains for a relatively long time, and therefore, the bias problem may be more serious. Therefore, a bias adjustment signal with a lower level is needed so as to sufficiently counteract the bias problem in a relatively short time. In this case, the case exists where F1>F2 and Vb1>Vb2, or the case exists where F1<F2 and Vb1<Vb2, that is, (F1−F2)× (Vb1−Vb2)>0. Of course, similar to the preceding description, when the requirement for reducing the bias problem of the first display region 100 is different from the requirement for reducing the bias problem of the second display region 200, the case may also exist where (F1−F2)× (Vb1−Vb2)<0. That is, the region with the relatively high data refresh rate required to have no problems such as the flickers needs a lower bias adjustment signal while only a certain bias adjustment signal needs to be provided for the relatively static images as long as display requirements for the relatively static images are satisfied.

Optionally, in this embodiment, $F1>F2$ and $|F1/F2|>|Vb1/Vb2|$. When $F1>F2$ and $|Vb1<|Vb2|$, this formula is naturally true. For the case where $F1>F2$ and $|Vb1|>|Vb2|$, the explanation is provided below. As described above, F1 and F2 often determine the data refresh rate of the first pixel circuit 101 and the data refresh rate of the second pixel circuit 102, for example, when the data refresh rate of the first pixel circuit 101 is 60 Hz and the data refresh rate of the second pixel circuit 102 is 30 Hz, $F1/F2=2$. Action of the bias adjustment signal is to raise the potential of the second electrode of the drive transistor T0 (the drive transistor T0 is the PMOS transistor) or lower the potential of the second electrode of the drive transistor T0 (the drive transistor T0 is the NMOS transistor), so as to reverse the potential difference between the gate of the drive transistor T0 and the second electrode of the drive transistor T0. If the potential of the gate of the drive transistor T0 is Vg and the potential of the second electrode of the drive transistor T0 is Vd, the potential difference to be adjusted is $|Vd-Vg|$. Generally, potential of the bias adjustment signal is between 5 V to 6 V. The potential of the bias adjustment signal varies by 1 V, which may cause a relatively large variation of $|Vd-Vg|$. If the bias adjustment signal varies according to the ratio of F1/F2, the bias adjustment signal has relatively large variation amplitude. However, the variation of the bias adjustment signal is excessively large, for example, for the PMOS drive transistor, the relatively low bias adjustment signal does not have relatively good bias adjustment action and an excessively high bias adjustment signal causes an increase in the power consumption, and for the NMOS drive transistor, the relatively high bias adjustment signal does not have the relatively good bias adjustment action and an excessively low bias adjustment signal also causes the increase in the power consumption. Thus, generally, the variation amplitude of the bias adjustment signal is set to be smaller than variation amplitude of the data refresh rate. That is, when $F1>F2$, $|F1/F2|>Vb1/Vb21$.

Further, in this embodiment, F01 is used as a crossover frequency, when $F1>F2>F01$, $|F1/F2|<|Vb1/Vb2|$, and when $F01>F1>F2$, $|F1/F21|>|Vb1/Vb2|$. Since the data refresh rate is increased, F1/F2 is gradually reduced, for example, F1 is 120 Hz and F2 is 100 Hz, and in this case, $|F1/F2|=1.2$. If the first bias adjustment signal Vb1 is 5 V and the second bias adjustment signal is 4 V, $|Vb1/Vb2|=1.25$. In this case, $|F1/F2|<|Vb1/Vb2|$, that is, when the data refresh rate is increased to a certain extent, F1/F2 is reduced, and that $|F1/F2|<|Vb1/Vb2|$ does not cause a relatively large variation of the bias adjustment signal. When $F01>F1>F2$, F1/F2 is gradually increased along with the reduction of the data refresh rate. For example, F1 is 30 Hz, F2 is 1 Hz, and in this case, $|F1/F2|=30$. In this case, if the first bias adjustment signal Vb1 is 5 V and the second bias adjustment signal Vb2 is 30 times Vb1 or $\frac{1}{30}$ of Vb1, the second bias adjustment signal Vb2 is excessively high or excessively low, which does not have the relatively good bias adjustment action. Therefore, in this case, $|F1/F2|>|Vb1/Vb2|$. Generally, F01 may be an intermediate value of a data refresh rate segment. For example, in the case where the data refresh rate varies within the range of 1 Hz to 120 Hz, F01 is a frequency value in an intermediate portion, for example, from 40 Hz to 80 Hz. Specifically, F01 may be 80 Hz, 60 Hz, 40 Hz, or the like.

Optionally, in this embodiment, the working process of the display panel includes a first stage and a second stage. A pulse variation frequency of a first control signal Vc1 received by the first pixel circuit 101 in the first stage minus a pulse variation frequency of a first control signal Vc1 received by the first pixel circuit 101 in the second stage is $\Delta F1$, and a first bias adjustment signal Vb1 received by the first pixel circuit 101 in the first stage minus a first bias adjustment signal Vb1 received by the first pixel circuit 101 in the second stage is $\Delta Vb$, where $\alpha F1\neq 0$ and $\Delta Vb\neq 0$.

In this embodiment, some cases may exist where the data refresh rate of the first display region 100 of the display panel may vary, for example, from 60 Hz to 30 Hz. The pulse variation frequency of the first control signal Vc1 determines the data refresh rate. Therefore, along with the variation of the data refresh rate, the pulse variation frequency of the first control signal Vc1 varies by amplitude of $\Delta F1$. As described above, when data refresh rates are different, bias problems of the drive transistors T0 are also different. Therefore, it may be set that $\Delta Vb\neq 0$, that is, the different bias adjustment signals are provided to adjust the different data refresh rates, respectively.

Optionally, in this embodiment, $\Delta F1\times \Delta Vb<0$. Referring to the preceding description, in the case where the drive transistor T0 is the PMOS transistor, when the data refresh rate becomes low, the light emission stage of the drive transistor T0 for the same data signal remains for a relatively long time, and therefore, the bias problem may be more serious. In this case, the relatively high bias adjustment signal needs to be provided to sufficiently adjust a bias state of the drive transistor T0. Therefore, when the data refresh rate becomes low, the bias adjustment signal rises so that $\Delta F1\times \Delta Vb<0$. In other embodiments, the case may also exist where $\alpha F1\times \Delta Vb>0$. For example, when a requirement for the bias problem of a region with the high data refresh rate is stricter, the case may exist where the data refresh rate is relatively high and the bias adjustment signal also becomes high, that is, $\Delta F1\times \Delta Vb>0$.

In the case where the drive transistor T0 is the NMOS transistor, when the data refresh rate becomes low and the bias problem may be more serious, the lower bias adjustment signal is needed to adjust the bias state. In this case, $\Delta F1\times \Delta Vb>0$. When the requirement for the bias problem of the region with the high data refresh rate is stricter, the case may exist where the data refresh rate is relatively high and the bias adjustment signal becomes low, that is, $\Delta F1\times \Delta Vb<0$.

Optionally, in this embodiment, the absolute value of the ratio of the pulse variation frequency of the first control signal Vc1 received by the first pixel circuit 101 in the first stage to the pulse variation frequency of the first control signal Vc1 received by the first pixel circuit 101 in the second stage is R11; and the absolute value of the ratio of the first bias adjustment signal Vb1 received by the first pixel circuit 101 in the first stage to the first bias adjustment signal Vb1 received by the first pixel circuit 101 in the second stage is R12, where $\Delta F1>0$ and $R11>R12$.

Referring to the preceding description, generally, the pulse variation frequency of the first control signal Vc1 has a variation of several times or even dozens of times. For example, the pulse variation frequency of the first control signal Vc1 varies from 60 Hz to 1 Hz, which is a variation of 60 times. However, the bias adjustment signal is generally between 0 V and 5 V, and the bias adjustment signal generally varies between 0 V and 2 V, which can affect the bias adjustment degree. Therefore, the variation amplitude of the bias adjustment signal is smaller than variation amplitude of the pulse variation frequency of the first control signal Vc1, that is, when ΔF1>0, R11>R12.

Figure 11:
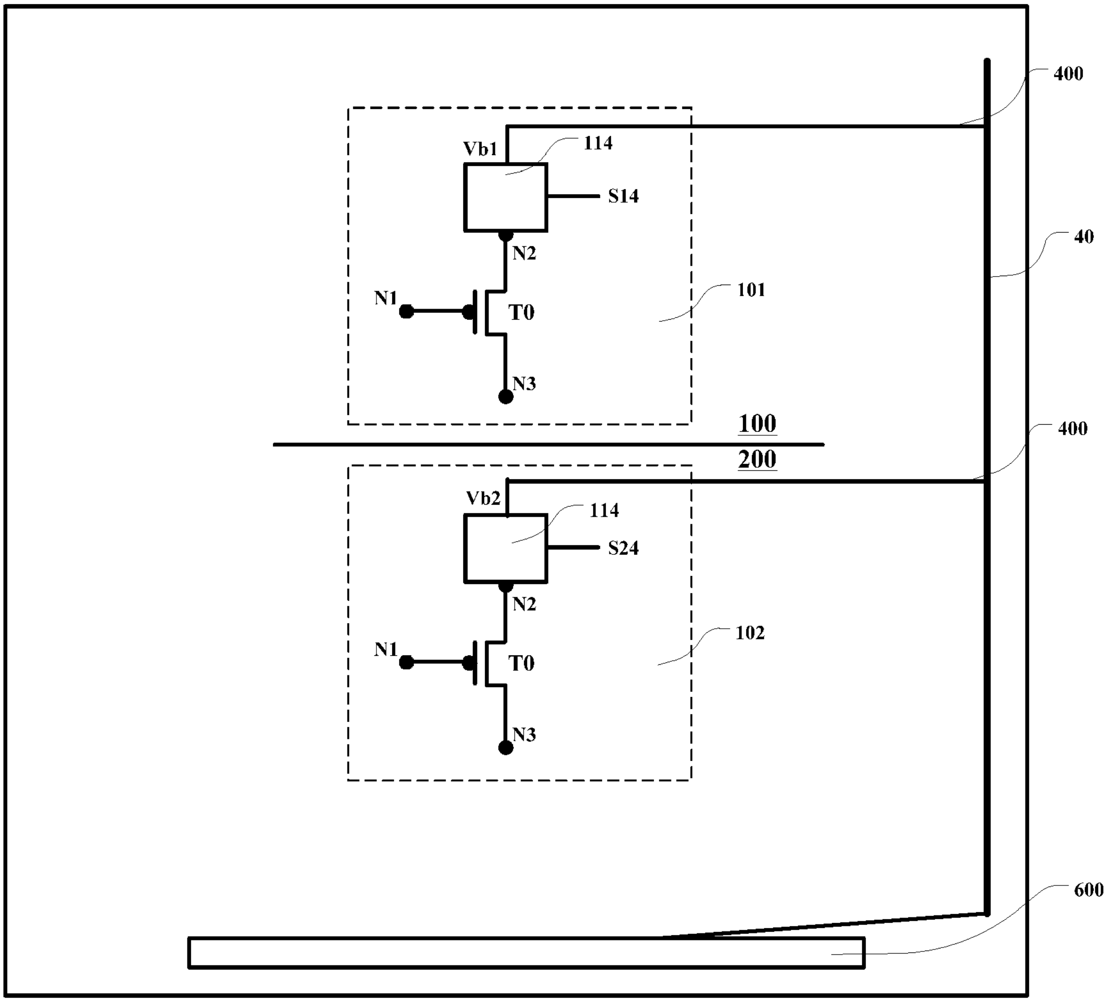
FIG. 11 is a schematic diagram of another display panel according to an embodiment of the present application.

Optionally, in this embodiment, referring to FIG. 11 which is a schematic diagram of another display panel according to an embodiment of the present application, the display panel includes a bias adjustment signal bus 40, where the bias adjustment signal bus 40 provides the first bias adjustment signal Vb1 for the first pixel circuit 101 through a bias adjustment signal line 400 and provides the second bias adjustment signal Vb2 for the second pixel circuit 102 through a bias adjustment signal line 400. When the control signal S14 controls the bias adjustment module 114 in the first pixel circuit 101 to be turned on, the control signal S24 controls the bias adjustment module 114 in the second pixel circuit 102 to be turned off, and a signal on the bias adjustment signal bus 40 is the first bias adjustment signal Vb1; and when the control signal S14 controls the bias adjustment module 114 in the first pixel circuit 101 to be turned off, the control signal S24 controls the bias adjustment module 114 in the second pixel circuit 102 to be turned on, and a signal on the bias adjustment signal bus 40 is the second bias adjustment signal Vb2.

In this embodiment, since the first pixel circuit 101 and the second pixel circuit 102 are in the different display regions, in order to sufficiently reduce the number of bias adjustment signal buses to save a bezel area of the display panel, the same bias adjustment signal bus may be used for providing the bias adjustment signals for the first pixel circuit 101 and the second pixel circuit 102. In this case, in order to prevent signal crosstalk, it is necessary to ensure that when the bias adjustment module 114 in the first pixel circuit 101 is turned on, the bias adjustment module 114 in the second pixel circuit 102 is turned off, and in this case, the signal on the bias adjustment signal bus 40 is the first bias adjustment signal Vb1 and the bias adjustment signal bus 40 is used for providing the bias adjustment signal for the first pixel circuit 101. When the bias adjustment module 114 in the first pixel circuit 101 is turned off, the bias adjustment module 114 in the second pixel circuit 102 is turned on, and in this case, the signal on the bias adjustment signal bus 40 is the second bias adjustment signal Vb2 and the bias adjustment signal bus 40 is used for providing the bias adjustment signal for the second pixel circuit 102.

Figure 12:
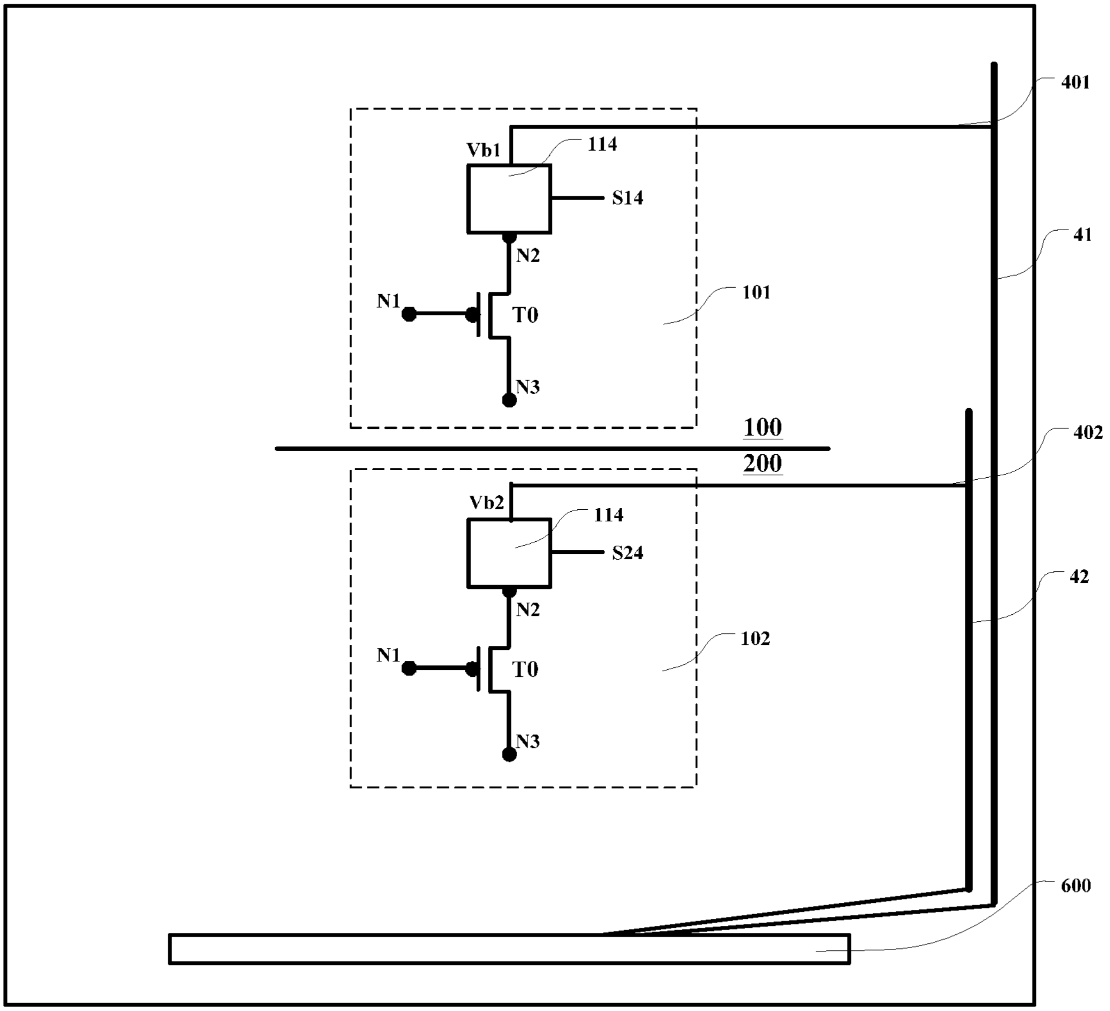
FIG. 12 is a schematic diagram of another display panel according to an embodiment of the present application.

In addition, optionally, in this embodiment, referring to FIG. 12 which is a schematic diagram of another display panel according to an embodiment of the present application, the display panel includes a first bias adjustment signal bus 41 and a second bias adjustment signal bus 42, where the first bias adjustment signal bus 41 provides the first bias adjustment signal Vb1 for the first display region 100 through a first bias adjustment signal line 401, and the second bias adjustment signal bus 42 provides the second bias adjustment signal Vb2 for the second display region 200 through a second bias adjustment signal line 402. If a bezel of the display panel permits, the first bias adjustment signal bus 41 and the second bias adjustment signal bus 42 may exist at the same time which provide the bias adjustment signals for the first pixel circuit 101 and the second pixel circuit 102, respectively. In this case, the signals on the first bias adjustment signal bus 41 and the second bias adjustment signal bus 42 may remain unvaried, and the second pixel circuit 102 may also receive the second bias adjustment signal Vb2 when the first pixel circuit 101 receives the first bias adjustment signal Vb1, and the two processes may occur at the same time without affecting each other.

Optionally, in this embodiment, in the at least one stage in the working process of the display panel, a working process of the first pixel circuit 101 includes a first data write frame and a first retention frame, and a working process of the second pixel circuit 102 includes a second data write frame and a second retention frame, where a first bias adjustment signal is Vb11 in the first data write frame, a first bias adjustment signal is Vb12 in the first retention frame, a second bias adjustment signal is Vb21 in the second data write frame, and a second bias adjustment signal is Vb22 in the second retention frame, where Vb11≠Vb21, and/or Vb12≠Vb22.

As described above, the data write frame refers to the subframe in which the data signal Vdata is input, and the retention frame refers to the subframe in which no data signal Vdata is input. When the data refresh rate of the first pixel circuit 101 is different from the data refresh rate of the second pixel circuit 102, the number of data write frames and the number of retention frames of the first pixel circuit 101 are also different from the number of data write frames and the number of retention frames of the second pixel circuit 102 in one data refresh period. However, for the same pixel circuit, the bias adjustment signal of the data write frame and the bias adjustment signal of the retention frame may be the same or different. Therefore, on the basis of the preceding description, the bias adjustment signal received by the first pixel circuit 101 is different from the bias adjustment signal received by the second pixel circuit 102, which is embodied in different bias adjustment signals in the data write frames and/or different bias adjustment signals in the retention frames, that is, Vb11≠Vb21, and/or Vb12≠Vb22.

In some embodiments, the difference between the first bias adjustment signal Vb11 in the first data write frame and the second bias adjustment signal Vb21 in the second data write frame remains consistent with the difference between the first bias adjustment signal Vb12 in the first retention frame and the second bias adjustment signal Vb22 in the second data write frame, that is, |Vb11−Vb21|=|Vb12−Vb22|. In this case, variation amplitude of the bias adjustment signal in the data write frame and variation amplitude of the bias adjustment signal in the retention frame remain consistent with the variation amplitude of the data refresh rate, thereby facilitating a uniform adjustment for the data write frame and the retention frame and simplifying the process.

In some other embodiments, the case may also exist where |Vb11−Vb21|>|Vb12−Vb22|, or the case may also exist where |Vb11−Vb21|<|Vb12−Vb22|. For example, when the first pixel circuit 101 has a relatively high data refresh rate of 120 Hz and the second pixel circuit 102 has a relatively low data refresh rate of 1 Hz, the number of second retention frames is much larger than the number of first retention frames. However, if the number of retention frames is larger, the drive transistor T0 remains for a longer time for the same data signal and the bias problem may be more serious. Therefore, the difference between the bias adjustment signal in the second retention frame and the bias adjustment signal in the first retention frame may be set to be relatively significant. However, for the data write frames, one data refresh period includes one or several data write frames, and therefore, the difference in the number of data write frames is smaller than the difference in the number of retention frames. Therefore, the difference between the bias adjustment signal of the first data write frame and the bias adjustment signal of the second data write frame may be set to be relatively small, that is, |Vb11−Vb21|<|Vb12−Vb22|. In other cases, when the difference between the data refresh rate of the first pixel circuit 101 and the data refresh rate of the second pixel circuit 102 is relatively not too significant or both the data refresh rate of the first pixel circuit 101 and the data refresh rate of the second pixel circuit 102 are relatively high, for example, the data refresh rate of the first pixel circuit 101 is 120 Hz and the data refresh rate of the second pixel circuit 102 is 90 Hz, the number of first data write frames is relatively large, the number of second data write frames is relatively large, and the difference in the bias problem is mainly embodied in the difference between the bias adjustment signals of the data write frames. Then, the difference between the first bias adjustment signal Vb1 received by the first data write frame and the second bias adjustment signal Vb2 received by the second data write frame may be set to be relatively significant, and the difference between the bias adjustment signals of the retention frames may be set to be relatively small, that is, $|Vb11-Vb21|>|Vb12-Vb22|$.

Figure 13:
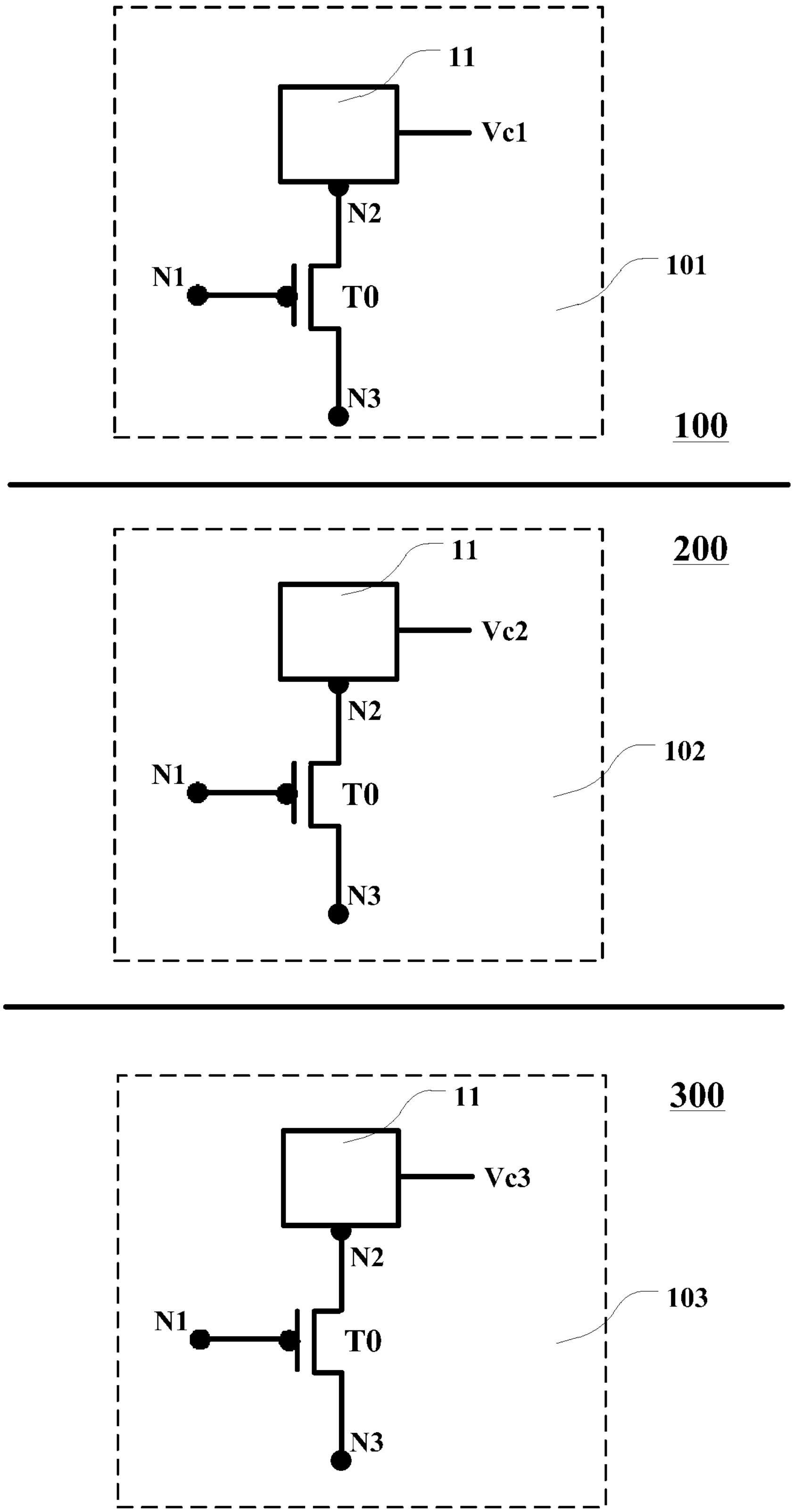
FIG. 13 is a schematic diagram of another display panel according to an embodiment of the present application.

Optionally, referring to FIG. 13 which is a schematic diagram of another display panel according to an embodiment of the present application, the display panel further includes a third display region 300, where the pixel circuit includes a third pixel circuit 103 connected to a light-emitting element 20 in the third display region 300. A control terminal of a first presetting module 11 in the third pixel circuit 103 is configured to receive a third control signal Vc3. In the at least one stage in the working process of the display panel, the pulse variation frequency of the first control signal Vc1 is F1, the pulse variation frequency of the second control signal Vc2 is F2, and a pulse variation frequency of the third control signal Vc3 is F3, where $F1\neq F3$, and $F2\neq F3$.

In this embodiment, the display panel may include more than two display regions with different data refresh rates. The display panel may include three or more display regions with different data refresh rates, for example, the first display region 100 is a display region where the game images are displayed, the second display region 200 is a display region where the characters are displayed, and the third display region 300 is a display region where the time information is displayed. Then, in the case where the three or more display regions with the different data refresh rates are included, the pulse variation frequencies of the control signals of the first presetting modules 11 in the three display regions are different from each other.

Optionally, a bias adjustment module 114 in the third pixel circuit 103 is configured to receive a third bias adjustment signal Vb3, where $F1>F2>F3$, and at least two of Vb1, Vb2, and Vb3 are not equal to each other. As described above, when the data refresh rates are different, appropriate bias adjustment signals may be respectively designed for the different display regions according to the display requirements of the display panel. Therefore, at least two of Vb1, Vb2, and Vb3 are not equal to each other. For example, when both F1 and F2 are high frequencies and F3 is a low frequency, it may be designed that $Vb1=Vb2\neq Vb3$, thereby simplifying the process. In particular, when requirements for bias adjustment effects of the first display region 100, the second display region 200, and the third display region 300 are all relatively strict, it is designed that $Vb1\neq Vb2\neq Vb3$.

Optionally, in this embodiment, $F1>F2>F3$, and $|F2/F3-F1/F2|>||Vb2/Vb3|-|Vb1/Vb2||\geq 0$. As indicated above, generally, the data refresh rate has the variation of several times or even dozens of times. Therefore, F2/F3 and/or F1/F2 may both be relatively large values. Especially for F2/F3, the smaller the F3 is, the larger the F2/F3 is. However, the bias adjustment signal generally varies within the range of 0 V to 2 V, and therefore, $|Vb2/Vb3|$ and $|Vb1/Vb2|$ are generally relatively small values, and the absolute value of the difference between $|Vb2/Vb3|$ and $|Vb1/Vb2|$ is smaller. Therefore, generally, the case exists where $|F2/F3-F1/F2|>||Vb2/Vb3|-|Vb1/Vb2||>0$. Thus, the variation among the data refresh rates of the different display regions is ensured and it is also ensured that the bias adjustment signals of the different display regions can satisfy bias adjustment requirements of the different display regions, respectively.

Figure 14:
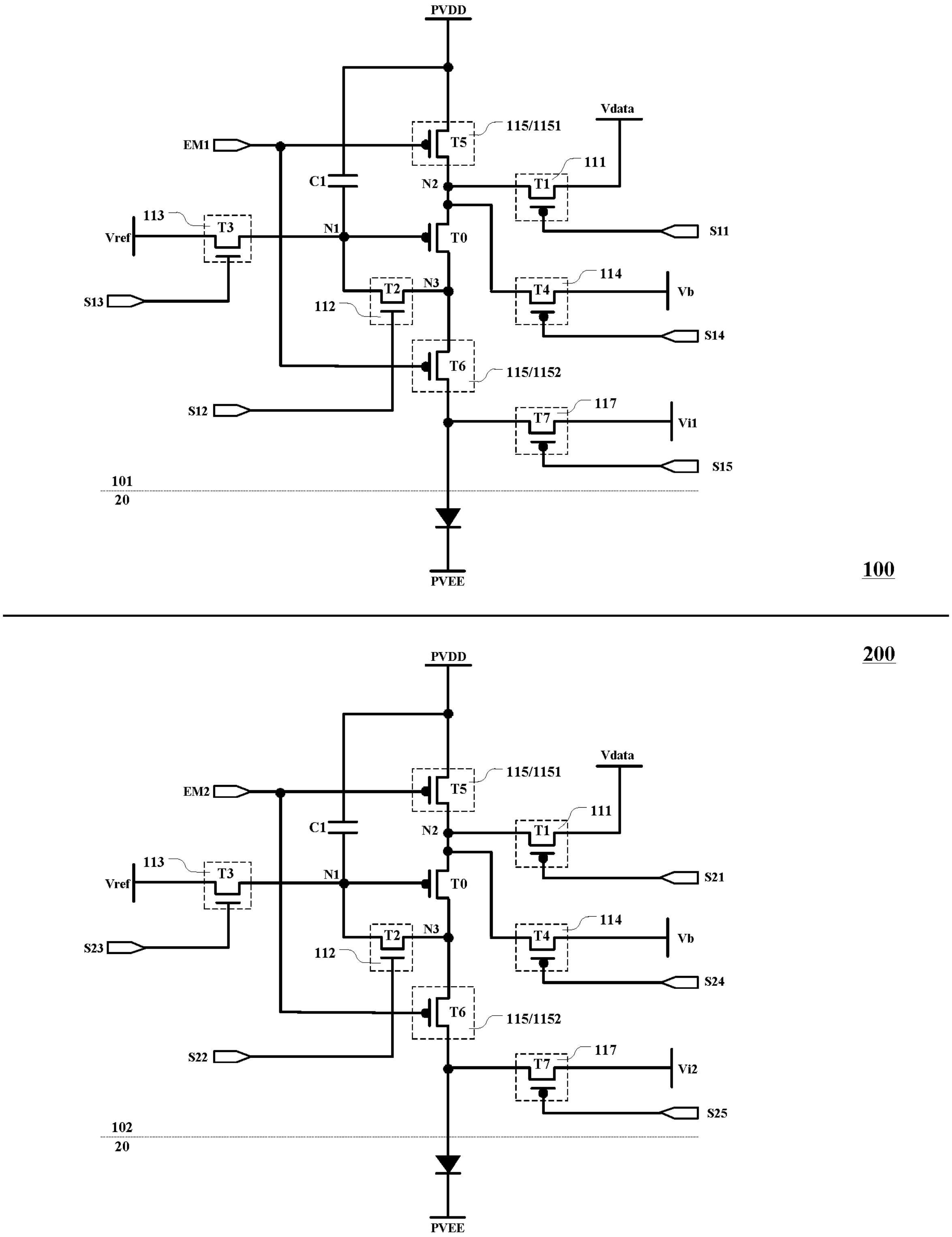
FIG. 14 is a schematic diagram of another display panel according to an embodiment of the present application.
Figure 15:
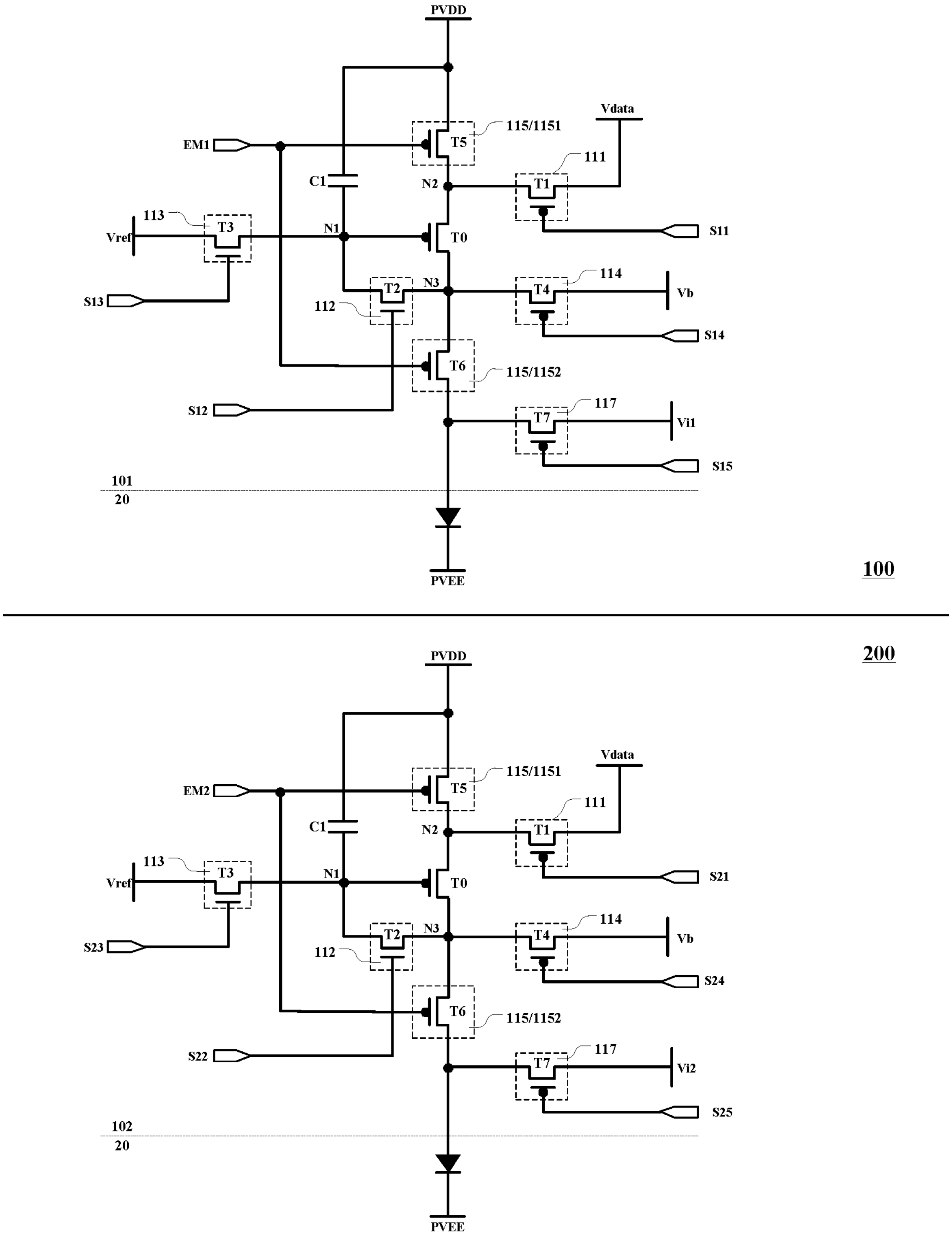
FIG. 15 is a schematic diagram of another display panel according to an embodiment of the present application.
Figure 16:
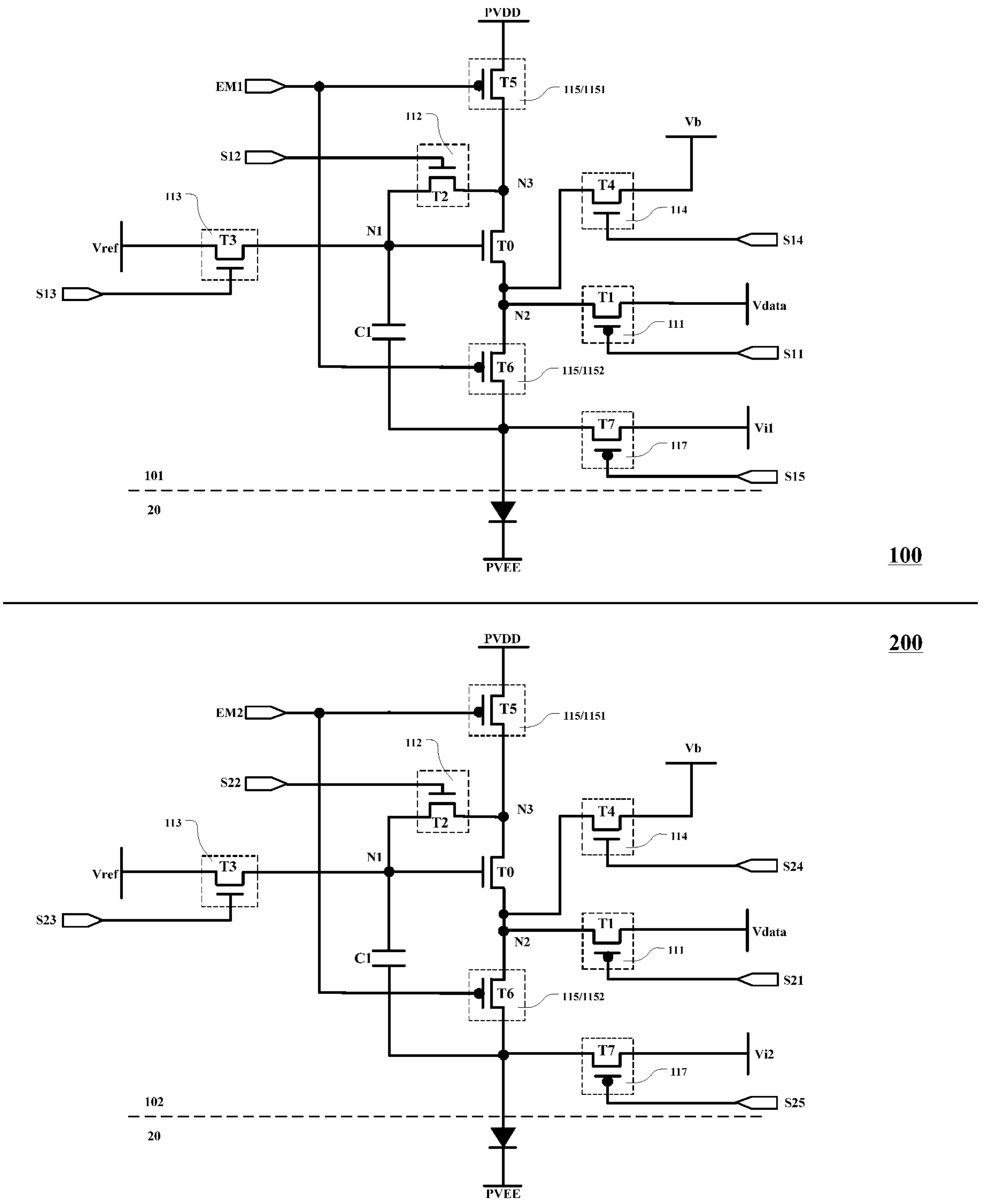
FIG. 16 is a schematic diagram of another display panel according to an embodiment of the present application.
Figure 17:
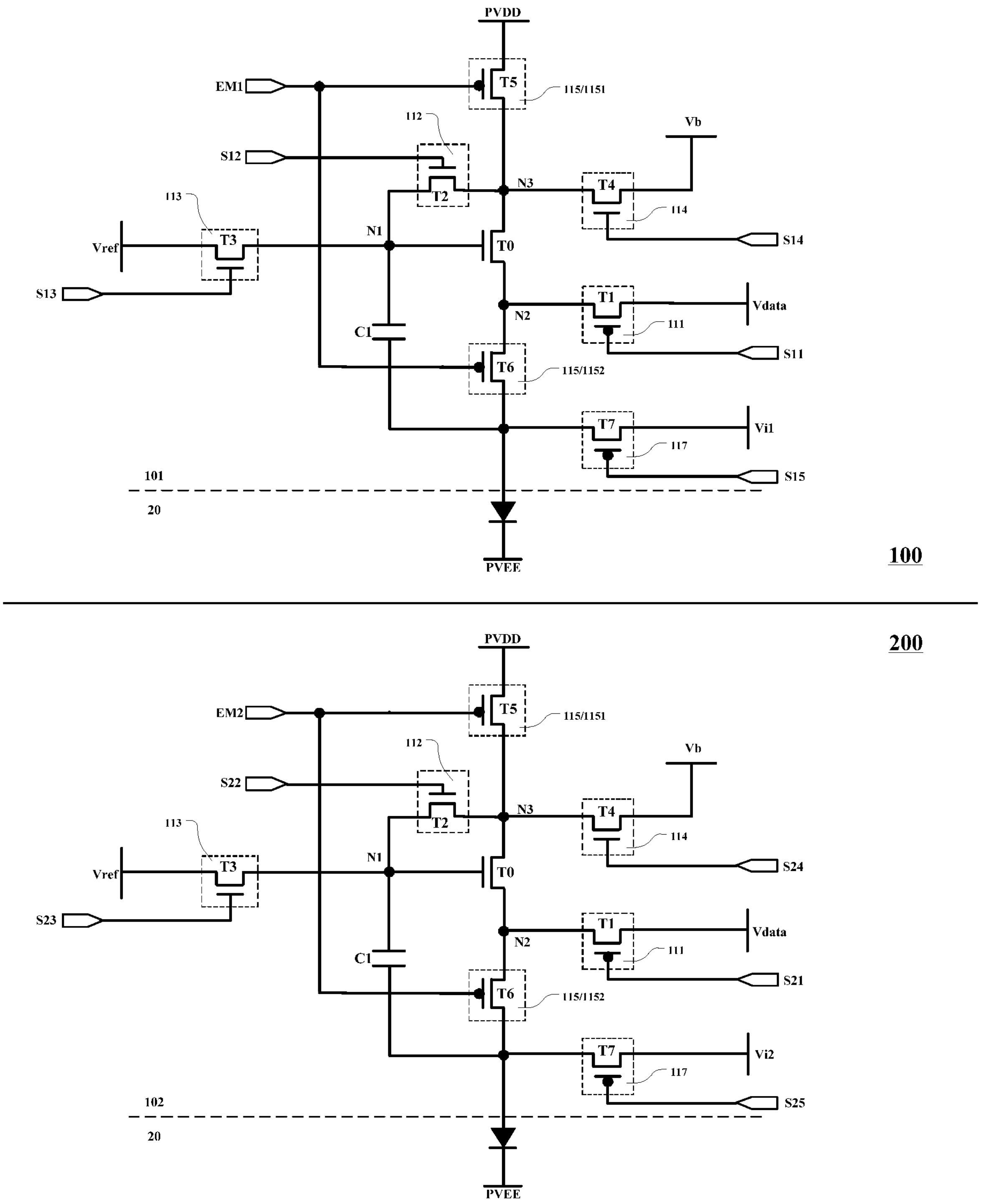
FIG. 17 is a schematic diagram of another display panel according to an embodiment of the present application.

Optionally, referring to FIGS. 14 to 17, FIG. 14 is a schematic diagram of another display panel according to an embodiment of the present application, FIG. 15 is a schematic diagram of another display panel according to an embodiment of the present application, FIG. 16 is a schematic diagram of another display panel according to an embodiment of the present application, and FIG. 17 is a schematic diagram of another display panel according to an embodiment of the present application. The display panel includes the initialization module 117 connected between the initialization signal terminal and the light-emitting element 20, where the initialization module 117 in the first pixel circuit 101 is configured to provide a first initialization signal Vi1 for the light-emitting element 10 in the first display region 100, and the initialization module 117 in the second pixel circuit 102 is configured to provide a second initialization signal Vi2| for the light-emitting element 20 in the second display region 200.

It is to be noted that as shown in FIGS. 14 and 15, the drive transistor T0 is the PMOS transistor, and the bias adjustment module 114 is connected to the first electrode of the drive transistor T0 (as shown in FIG. 14) or the second electrode of the drive transistor T0 (as shown in FIG. 15); and as shown in FIGS. 16 and 17, the drive transistor T0 is the NMOS transistor, and the bias adjustment module 114 is connected to the first electrode of the drive transistor T0 (as shown in FIG. 16) or the second electrode of the drive transistor T0 (as shown in FIG. 17). In addition, when the pixel circuit does not include the bias adjustment module 114, the initialization signal is also set according to the preceding limitation, which also falls within the scope of this embodiment.

Optionally, in some embodiments, when $F1\neq F2$, $Vi1=Vi2$, that is, the data refresh rate of the first pixel circuit 101 is different from the data refresh rate of the second pixel circuit 102, but the initialization signal Vi1 received by the first pixel circuit 101 is the same as the initialization signal Vi2|received by the second pixel circuit 102. Action of the initialization signal is to initialize the light-emitting element, light emission time of the pixel circuits is different, voltages are different, and therefore, it is necessary to determine whether different initialization signals need to be used. Generally, when the light emission time of the pixel circuits with the different data refresh rates is not too different and the same initialization signal can satisfy the requirements, the light-emitting elements may be initialized with the same initialization signal, that is, when $F1\neq F2$, $Vi1=Vi2$.

Optionally, in some embodiments, when $F1\neq F2$, $Vi1\neq Vi2$, that is, the data refresh rate of the first pixel circuit 101 is different from the data refresh rate of the second pixel circuit 102, and the initialization signal received by the first pixel circuit 101 is also different from the initialization signal received by the second pixel circuit 102. In some cases, the difference between the data refresh rate of the first pixel circuit 101 and the data refresh rate of the second pixel circuit 102 is relatively significant, resulting in a relatively significant difference between time of a light emission stage of the first pixel circuit 101 and time of a light emission stage of the second pixel circuit 102. For example, when a first data refresh rate is relatively high, the light-emitting element remains at the same drive current for a relatively short time, that is, a voltage on the light-emitting element remains varied. However, when a second data refresh rate is relatively low, the light-emitting element remains at the same drive current for a relatively long time, that is, a voltage on the light-emitting element may remain unvaried for a long time. For the preceding two cases, initialization requirements for the light-emitting elements may be different. Particularly, when a grayscale of the light-emitting element in a previous refresh period is relatively different from a grayscale of the light-emitting element in a subsequent refresh period, it is necessary to perform the initialization process more sufficiently if the light-emitting element remains at the same drive current for a relatively long time. Therefore, for the different data refresh rates, different initialization voltages may be needed to perform respective initialization adjustments, that is, F1≠F2, and Vi1≠Vi2.

Optionally, in this embodiment, in some cases, (F1−F2)×(|Vi1|−|Vi2|)<0, that is, F1>F2 and |Vi1|<|Vi2|, or F1<F2 and |Vi1|>|Vi2|. When the pulse variation frequency of the control signal is higher, that is, the data refresh rate is higher, the absolute value of a voltage value of the initialization signal is larger. Generally, as shown in FIGS. 14 to 17, in the display panel, the light-emitting element includes an anode and a cathode, where the anode is connected to the first power signal terminal through the pixel circuit and configured to receive the first power signal PVDD, and the cathode is connected to a second power signal terminal and configured to receive a second power signal PVEE. Generally, a PVEE voltage is a low level signal which is a negative voltage value, and a PVDD is a high level signal which is a positive voltage value. In this embodiment, the first initialization signal Vi1 or the second initialization signal Vi2| is generally applied to the anode of the light-emitting element. In the light emission stage, potential of the anode of the light-emitting element is higher than potential of the cathode of the light-emitting element, and therefore, a potential difference is generated between the cathode and the anode. When the anode of the light-emitting element is initialized, an anode voltage is generally initialized to a certain value and another anode voltage is input in the next frame. Therefore, in this case, the initialization signal is generally a negative voltage. In this case, if |Vi1|>|Vi2|, a voltage value of Vi1 is less than a voltage value of V2, and if |Vi1|<|Vi2|, a voltage value of Vi2 is less than a voltage value of Vi1. When F1>F2 and |Vi1<||Vi2|, the data refresh rate of the first pixel circuit is higher than the data refresh rate of the second pixel circuit. As described above, when the data refresh rate is lower, the light-emitting element remains at the same drive current for a longer time, that is, the anode of the light-emitting element remains at the same voltage for a relatively long time. Then, in order that the light-emitting element is sufficiently initialized, an initialization voltage with a relatively large absolute value may be provided, which is a lower negative voltage, and thus, the light-emitting element is sufficiently initialized in a relatively short time. In addition, the data refresh rate is lower and the anode voltage of the light-emitting element remains unvaried for a relatively long time. Therefore, a relatively low initialization voltage may be provided so that the initialization process is performed sufficiently. However, when the data refresh rate is relatively high, the light-emitting element remains at the same drive current for a relatively short time. Then, a negative voltage value with a relatively small absolute value may be provided. Thus, after an initialization stage ends, an anode signal can be relatively fast applied to the anode of the light-emitting element, thereby facilitating a high-frequency conversion of the anode signal.

Optionally, in this embodiment, in other cases, the case may also exist where (F1−F2)×(|Vi1|−|Vi2|)>0, that is, F1>F2 and |Vi1|>|Vi2|. When the display requirements for the first display region 100 and the second display region 200 are different so that the initialization requirements for the light-emitting elements are different, the case may exist where when the data refresh rate is higher, the absolute value of the initialization signal is larger and the voltage is lower. For example, when it is required that the flickers are avoided as much as possible in a region with a high data refresh rate so that high-quality image switching is implemented, it may be required that |Vi1|>|Vi2|. Thus, sufficient initialization is performed through an initialization signal with a relatively small voltage value in the region with the high data refresh rate, and the case is sufficiently avoided where the insufficient initialization of an anode voltage of the previous frame causes an inaccurate anode voltage signal of the next frame, thereby causing the flickers during image switching.

Optionally, in this embodiment, F1>F2, and |F1/F2|>|Vi1/Vi2|. When F1>F2 and |Vi1|<|Vi2|, this formula is naturally true. For the case where F1>F2 and |Vi1|>|Vi2|, the explanation is provided below. F1 refers to the pulse variation frequency of the first control signal and F2 refers to the pulse variation frequency of the second control signal, both of which represent the data refresh rate to a certain extent. However, during an actual operation, the data refresh rate generally has the variation of several times or dozens of times. For example, when F1 is 60 Hz and F2 is 30 Hz, |F1/F2|=2, and when F1 is 120 Hz and F2 is 1 Hz, |F1/F2|=120. However, the initialization signal is generally between −5 V and 0 V, and the difference between the first initialization signal Vi1 and the second initialization signal Vi2| is generally between 0 V and 2 V. Generally, an effect difference needed by the present application can be generated with a difference of 1 V in the initialization stage. Therefore, |Vi1/Vi2| is generally small, and it is set in this embodiment that |F1/F2|>|Vi1/Vi2||.

Optionally, in this embodiment, F02 is used as the crossover frequency, when F1>F2>F02, |F1/F2|<|Vi1/Vi2||, and when F02>F1>F2, |F1/F2|>|Vi1/Vi2|. Since the data refresh rate is increased, F1/F2 is gradually reduced, for example, F1 is 120 Hz and F2 is 100 Hz, and in this case, |F1/F2|=1.2. If the first initialization signal Vi1 is −3V, the second initialization signal is −2V, and |Vi1/Vi2|=1.5. In this case, |F1/F2|<|Vi1/Vi2|, that is, when the data refresh rate is increased to a certain extent, F1/F2 is reduced, and that |F1/F2|<|Vi1/Vi2| does not cause a relatively large variation of the initialization signal. When F02>F1>F2, F1/F2 is gradually increased along with the reduction of the data refresh rate. For example, F1 is 30 Hz, F2 is 1 Hz, and in this case, |F1/F2|=30. In this case, if the first initialization signal Vi1 is −3V and the second initialization signal Vi2| is 30 times Vi1 or 1/30 of Vi1, the second initialization signal Vi2| is excessively high or excessively low, which does not have relatively good initialization action. Therefore, in this case, |F1/F2|>|Vi1/Vi2|. Generally, F02 may be the intermediate value of the data refresh rate segment. For example, in the case where the data refresh rate varies within the range of 1 Hz to 120 Hz, F02 is the frequency value in the intermediate portion, for example, from 40 Hz to 80 Hz. Specifically, F01 may be 80 Hz, 60 Hz, 40 Hz, or the like.

Optionally, in this embodiment, the working process of the display panel includes a third stage and a fourth stage. A pulse variation frequency of a first control signal Vc1 received by the first pixel circuit 101 in the third stage minus a pulse variation frequency of a first control signal Vc1 received by the first pixel circuit 101 in the fourth stage is ΔF2, and a first initialization signal received by the first pixel circuit 101 in the third stage minus a first initialization signal received by the first pixel circuit 101 in the fourth stage is ΔVi, where $\Delta F2 \neq 0$ and $\Delta Vi \neq 0$.

In this embodiment, some cases may exist where the data refresh rate of the first display region 100 of the display panel may vary, for example, from 60 Hz to 30 Hz. The pulse variation frequency of the first control signal Vc1 determines the data refresh rate. Therefore, along with the variation of the data refresh rate, the pulse variation frequency of the first control signal Vc1 varies by amplitude of ΔF2. As described above, when the data refresh rates are different, the light-emitting elements have different requirements for the initialization signals. Alternatively, when the data refresh rates are different, requirements for initialization degrees of the light-emitting elements are different. Therefore, it may be set that $\Delta Vi \neq 0$, that is, the different initialization signals are provided to adjust the different data refresh rates, respectively.

Optionally, in this embodiment, $\Delta F2 \times \Delta Vi > 0$. Referring to the preceding description, when the initialization signal is the negative voltage and the pulse variation frequency of the first control signal is reduced, the data refresh rate decreases. In this case, since the anode of the light-emitting element remains at the same voltage for a relatively long time, in order that the initialization process is performed more sufficiently, a lower initialization voltage may be set. That is, the data refresh rate decreases, and the initialization signal is reduced. In this case, if the initialization signal is a negative value, the absolute value of the voltage value of the initialization signal increases instead. When the pulse variation frequency of the first control signal is increased, the data refresh rate increases. In this case, since the variation of the anode voltage of the light-emitting element is relatively significant, in order to satisfy the requirement that the anode voltage remains varied, a relatively large initialization voltage value may be set so that the fast input of the anode voltage is facilitated. That is, the data refresh rate increases, and the initialization signal is increased. In this case, if the initialization signal is the negative value, the absolute value of the voltage value of the initialization signal decreases instead.

In some other cases, the case may also exist where $\Delta F2 \times \Delta Vi < 0$. When the pulse variation frequency of the first control signal is increased, the data refresh rate increases. In addition, it is required to avoid the flickers as much as possible during the switching between different frames so as to ensure the display effect, in order that the anode voltage is initialized sufficiently, a relatively small voltage value of the initialization signal may also be set in this case. That is, the data refresh rate increases, and the initialization signal decreases. Since the initialization signal is the negative value, the absolute value of the initialization signal increases instead.

Optionally, in this embodiment, the absolute value of the ratio of the pulse variation frequency of the first control signal Vc1 received by the first pixel circuit 101 in the third stage to the pulse variation frequency of the first control signal Vc1 received by the first pixel circuit 101 in the fourth stage is R21; and the absolute value of the ratio of the first initialization signal received by the first pixel circuit 101 in the third stage to the first initialization signal received by the first pixel circuit 101 in the fourth stage is R22, where $\Delta F2 > 0$ and $R21 > R22$.

Referring to the preceding description, generally, the pulse variation frequency of the first control signal Vc1 has the variation of several times or even dozens of times. For example, the pulse variation frequency of the first control signal Vc1 varies from 60 Hz to 1 Hz, which is a variation of 60 times. However, the initialization signal is generally between −5V and 0 V, and the initialization signal generally varies between 0 V and 2 V, which can affect an initialization degree. Therefore, variation amplitude of the initialization signal is smaller than the variation amplitude of the pulse variation frequency of the first control signal Vc1, that is, $\Delta F2 > 0$ and $R21 > R22$.

Figure 18:
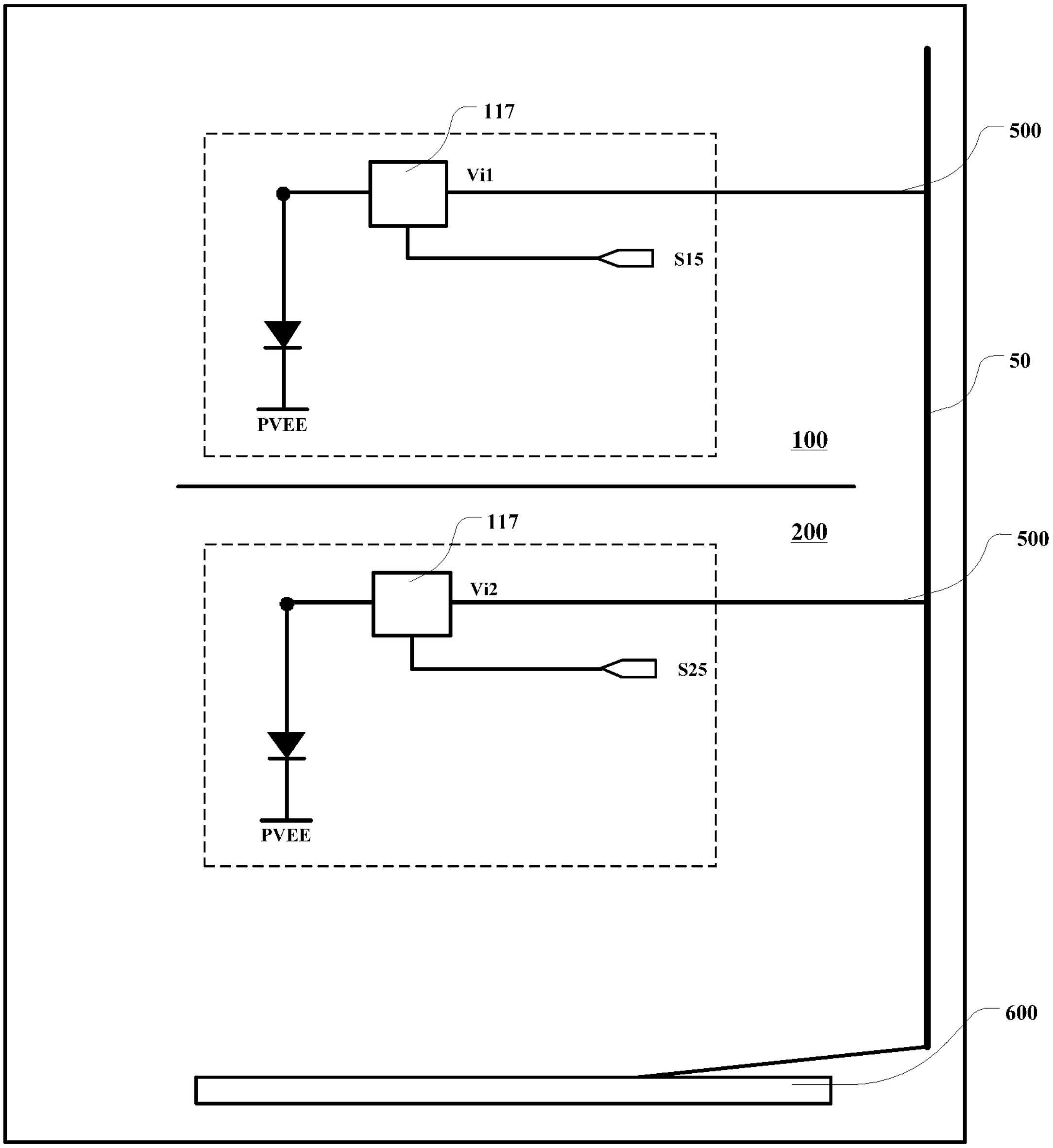
FIG. 18 is a schematic diagram of another display panel according to an embodiment of the present application.

Referring to FIG. 18 which is a schematic diagram of another display panel according to an embodiment of the present application, the display panel includes an initialization signal bus 50, where the initialization signal bus 50 provides the first initialization signal Vi1 for the first pixel circuit 101 through an initialization signal line 500 and provides the second initialization signal Vi2 for the second pixel circuit 102 through an initialization signal line 500. When the control signal S15 controls the initialization module 117 in the first pixel circuit 101 to be turned on, the control signal 25 controls the initialization module 117 in the second pixel circuit 102 to be turned off, and a signal on the initialization signal bus 50 is the first initialization signal Vi1; and when the control signal S15 controls the initialization module 117 in the first pixel circuit 101 to be turned off, the control signal S25 controls the initialization module 117 in the second pixel circuit 102 to be turned on, and a signal on the initialization signal bus 50 is the second initialization signal Vi2.

In this embodiment, since the first pixel circuit 101 and the second pixel circuit 102 are in the different display regions, in order to sufficiently reduce the number of initialization signal buses to save the bezel area of the display panel, the same initialization signal bus may be used for providing the initialization signals for the first pixel circuit 101 and the second pixel circuit 102. In this case, in order to prevent the signal crosstalk, it is necessary to ensure that when the initialization module 117 in the first pixel circuit 101 is turned on, the initialization module 117 in the second pixel circuit 102 is turned off, and in this case, the signal on the initialization signal bus 50 is the first initialization signal Vi1 and the initialization signal bus 50 is used for providing the initialization signal for the first pixel circuit 101. When the initialization module 117 in the first pixel circuit 101 is turned off, the initialization module 117 in the second pixel circuit 102 is turned on, and in this case, the signal on the initialization signal bus 50 is the second initialization signal Vi2 and the initialization signal bus 50 is used for providing the initialization signal for the second pixel circuit 102.

Figure 19:
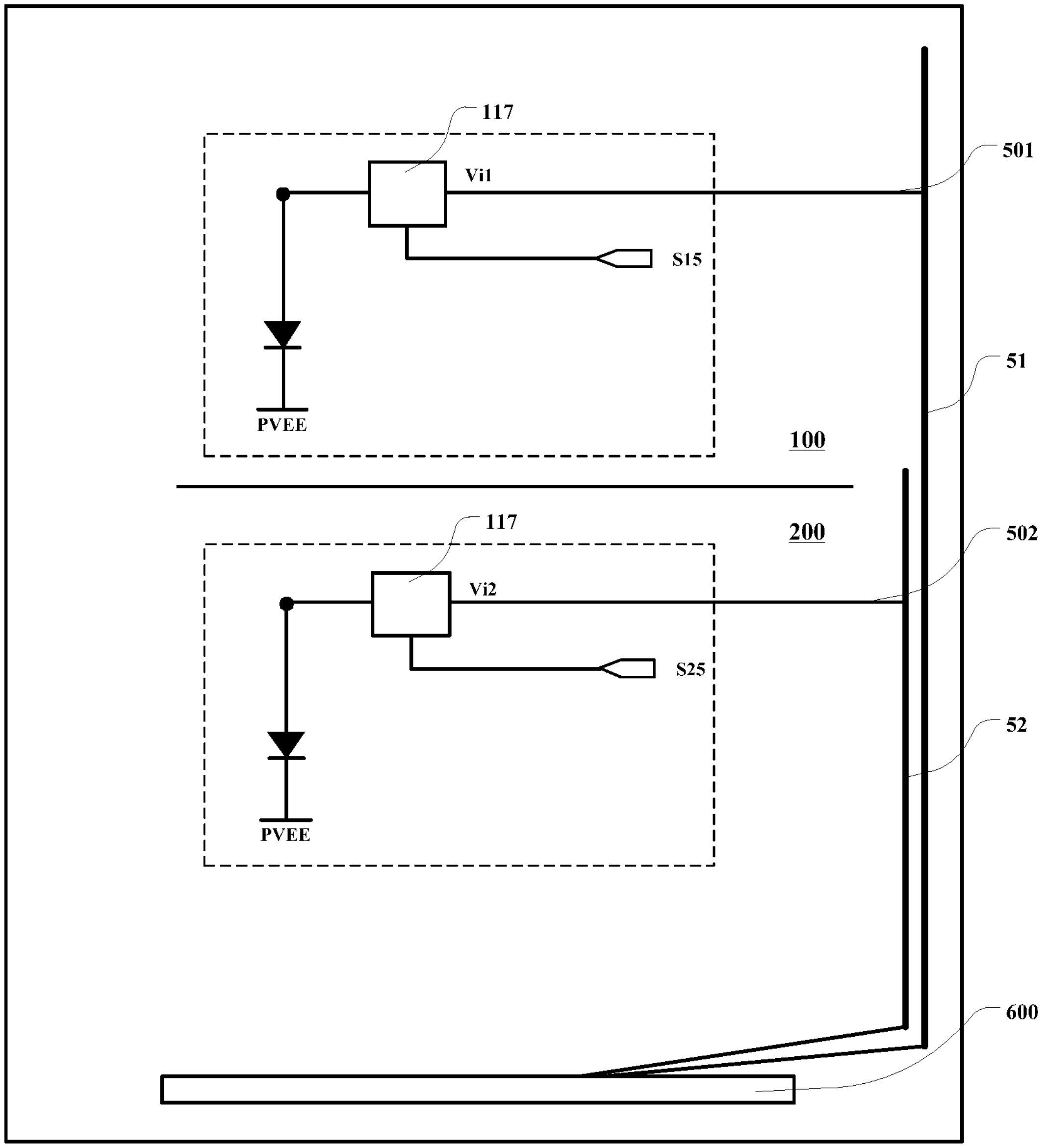
FIG. 19 is a schematic diagram of another display panel according to an embodiment of the present application.

In addition, optionally, in this embodiment, referring to FIG. 19 which is a schematic diagram of another display panel according to an embodiment of the present application, the display panel includes a first initialization signal bus 51 and a second initialization signal bus 52, where the first initialization signal bus 51 provides the first initialization signal Vi1 for the first display region 100 through a first initialization signal line 501, and the second initialization signal bus 52 provides the second initialization signal Vi2 for the second display region 200 through a second initialization signal line 502. If the bezel of the display panel permits, the first initialization signal bus 51 and the second initialization signal bus 52 may exist at the same time which provide the initialization signals for the first pixel circuit 101 and the second pixel circuit 102, respectively. In this case, the signals on the first initialization signal bus 51 and the second initialization signal bus 52 may remain unvaried, and the second pixel circuit 102 may also receive the second initialization signal Vi2 when the first pixel circuit 101 receives the first initialization signal Vi1, and the two processes may occur at the same time without affecting each other.

Optionally, in this embodiment, in the at least one stage of the working process of the display panel, the light-emitting element 20 in the first display region 100 works in a first brightness mode, the light-emitting element 20 in the second display region 200 works in a second brightness mode, brightness in the first brightness mode is L1, and brightness in the second brightness mode is L2, where L1≠L2.

In this embodiment, the different display regions have the different data refresh rates which are used for implementing different display functions. The data refresh rates of the different display regions are required to be different, which is often accompanied by different brightness modes. For example, a mode with relatively high brightness is generally required for the region where the images of the game, the movie, and the like are displayed, so as to provide relatively good user experience. However, an eye protection mode with relatively low brightness may be generally set for the region where the images of the time information, the characters, and the like are displayed, and the power consumption is saved. Therefore, in this embodiment, it is further limited that the first display region 100 and the second display region 200 work in the different brightness modes. Optionally, the brightness of the first display region 100 is higher than the brightness of the second display region 200, that is, L1>L2, and in some other embodiments, it is also possible that L1<L2, which is determined according to specific application situations and not particularly limited in the present application.

In another aspect of the embodiments of the present application, an integrated chip is provided. Referring to FIGS. 11 and 12 and FIGS. 18 and 19, the integrated chip 600 is configured to provide the first bias adjustment signal Vb1 for the first pixel circuit 101 in the first display region 100 and/or provide the second bias adjustment signal Vb2 for the second pixel circuit 102 in the second display region 200; and/or the integrated chip 600 is configured to provide the first initialization signal Vi1 for the first pixel circuit 101 in the first display region 100 and/or provide the second initialization signal Vi2 for the second pixel circuit 102 in the second display region 200.

Since the different display regions are included in the present application, the different display regions may receive the different bias adjustment signals, and/or the different display regions may receive the different initialization signals. The different bias adjustment signals or the different initialization signals may be provided by the integrated chip 600.

Optionally, as shown in FIG. 11, in the case where the display panel includes the bias adjustment signal bus 40, when the bias adjustment module 114 in the first pixel circuit 101 is turned on and the bias adjustment module 114 in the second pixel circuit 102 is turned off, the integrated chip 600 provides the first bias adjustment signal Vb1 for the bias adjustment signal bus 40, and when the bias adjustment module 114 in the first pixel circuit 101 is turned off and the bias adjustment module 114 in the second pixel circuit 102 is turned on, the integrated chip 600 provides the second bias adjustment signal Vb2 for the bias adjustment signal bus 40.

Optionally, as shown in FIG. 12, in the case where the display panel includes the first bias adjustment signal bus 41 and the second bias adjustment signal bus 42, the integrated chip 600 provides the first bias adjustment signal Vb1 for the first bias adjustment signal bus 41 and the second bias adjustment signal Vb2 for the second bias adjustment signal bus 42.

Optionally, as shown in FIG. 18, in the case where the display panel includes the initialization signal bus 50, when the initialization module 117 in the first pixel circuit 101 is turned on and the initialization module 117 in the second pixel circuit 102 is turned off, the integrated chip 600 provides the first initialization signal Vi1 for the initialization signal bus 50, and when the initialization module 117 in the first pixel circuit 101 is turned off and the initialization module 117 in the second pixel circuit 102 is turned on, the integrated chip 600 provides the second initialization signal Vi2 for the initialization signal bus 50.

Optionally, as shown in FIG. 19, in the case where the display panel includes the first initialization signal bus 51 and the second initialization signal bus 52, the integrated chip 600 provides the first initialization signal Vi1 for the first initialization signal bus 41 and the second initialization signal Vi2 for the second initialization signal bus 42.

In another aspect of the embodiments of the present application, a display device is provided. The display device includes the display panel in any one of the preceding embodiments and may also include the integrated chip in any of the preceding embodiments.

Figure 20:
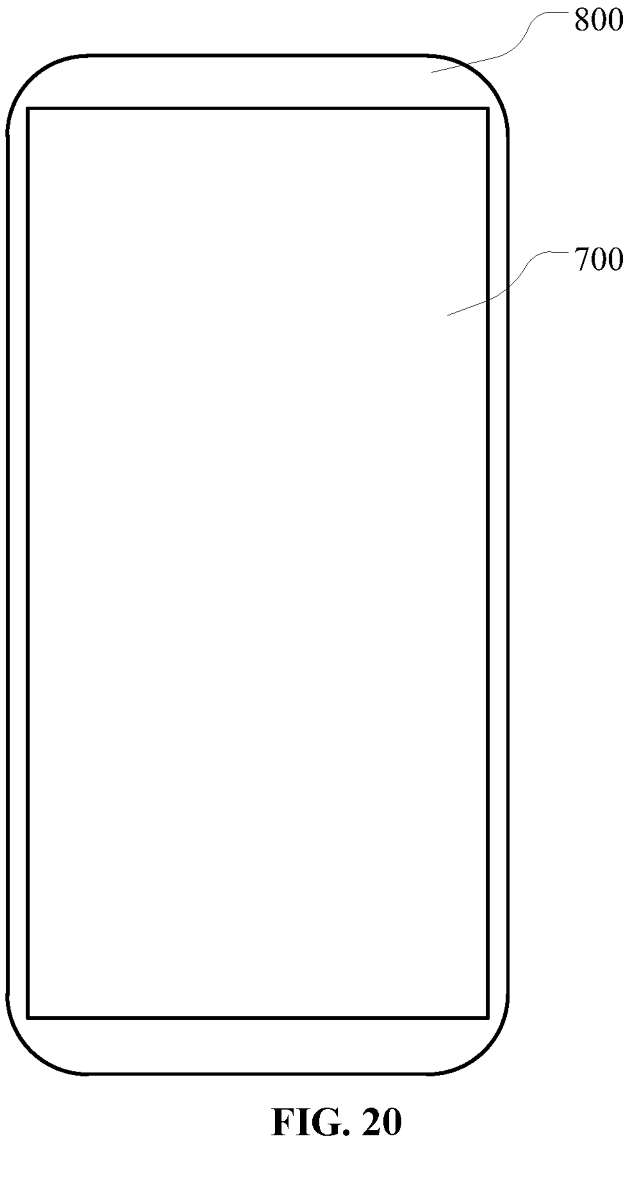
FIG. 20 is a schematic diagram of a display device according to an embodiment of the present application.

Referring to FIG. 20 is a schematic diagram of a display device according to an embodiment of the present application, the display device 800 includes the display panel 700. The display panel 700 may be the display panel described in any one of the preceding embodiments. The display device may be a mobile phone, a television, a laptop, a flat-panel display device, a smart wearable display device, or the like, which is not particularly limited in the present application.

From the preceding description, the present application provides the display panel, the integrated chip, and the display panel, where the display panel includes the first pixel circuit 101 connected to the light-emitting element 20 in the first display region 100 and the second pixel circuit 102 connected to the light-emitting element 20 in the second display region 200, the control terminal of the first presetting module 11 in the first pixel circuit 101 is configured to receive the first control signal Vc1, the control terminal of the first presetting module 11 in the second pixel circuit 102 is configured to receive the second control signal Vc2, and in the at least one stage in the working process of the display panel, the pulse variation frequency F1 of the first control signal Vc1 is not equal to the pulse variation frequency F2 of the second control signal Vc2. The terminal of the first presetting module 11 is connected to the drive transistor T0 and configured to transmit the preset signal to the drive transistor T0. Therefore, when F1≠F2, the frequency with which the first control signal Vc1 controls the first presetting module 11 to be turned on and off is different from the frequency with which the second control signal Vc2 controls the first presetting module 11 to be turned on and off. In this manner, the frequency with which the first pixel circuit 101 receives the preset signal is different from the frequency with which the second pixel circuit 102 receives the preset signal. The preset signal may be the data signal Vdata, the reset signal Vref, the bias adjustment signal, or the like. In the present application, with this design, the frequency with which the first pixel circuit 101 receives the preset signal is different from the frequency with which the second pixel circuit 102 receives the preset signal such that the transmission of the preset signal is controlled according to the respective functions of the first display region 100 and the second display region 200, thereby implementing their respective functions and sufficiently reducing the power consumption.

The preceding content is a further detailed description of the present disclosure in conjunction with the specific preferred embodiments, and the specific implementation of the present disclosure is not limited to the description. For those of ordinary skill in the art to which the present disclosure pertains, a number of simple deductions or substitutions may be made without departing from the concept of the present disclosure and should fall within the scope of the present disclosure.

What is claimed is:

1. A display panel, comprising:

a first display region and a second display region; and a pixel circuit comprising a first pixel circuit and a second pixel circuit, wherein the first pixel circuit is connected to a light-emitting element in the first display region, and the second pixel circuit is connected to a light-emitting element in the second display region;

wherein in at least one stage of a working process of the display panel, the light-emitting element in the first display region works in a first brightness mode, the light-emitting element in the second display region works in a second brightness mode, brightness in the first brightness mode is L1, and brightness in the second brightness mode is L2, wherein $L1 \neq L2$;

wherein the pixel circuit comprises a drive transistor and a bias adjustment module, the a bias adjustment module is connected to a first electrode of the drive transistor or a second electrode of the drive transistor and configured to provide a bias adjustment signal for the drive transistor; the bias adjustment module in the first pixel circuit is configured to receive a first bias adjustment signal Vb1, and the bias adjustment module in the second pixel circuit is configured to receive a second bias adjustment signal Vb2; wherein $Vb1 \neq Vb2$;

and/or wherein the pixel circuit comprises an initialization module, and the initialization module is connected to the light-emitting element and configured to provide an initialization signal for the light-emitting element; the initialization module in the first pixel circuit is configured to provide a first initialization signal Vi1, and the initialization module in the second pixel circuit is configured to provide a second initialization signal Vi2; wherein $Vi1 \neq Vi2$.

2. The display panel according to claim 1, comprising:

a bias adjustment signal bus providing the first bias adjustment signal Vb1 for the first pixel circuit and providing the second bias adjustment signal Vb2 for the second pixel circuit; wherein when the bias adjustment module in the first pixel circuit is turned on, the bias adjustment module in the second pixel circuit is turned off, and a signal on the bias adjustment signal bus is the first bias adjustment signal Vb1; and when the bias adjustment module in the first pixel circuit is turned off, the bias adjustment module in the second pixel circuit is turned on, and a signal on the bias adjustment signal bus is the second bias adjustment signal Vb2.

3. The display panel according to claim 1, comprising:

a first bias adjustment signal bus and a second bias adjustment signal bus; wherein the first bias adjustment signal bus provides the first bias adjustment signal Vb1 for the first display region through a first bias adjustment signal line; and the second bias adjustment signal bus provides the second bias adjustment signal Vb2 for the second display region through a second bias adjustment signal line.

4. The display panel according to claim 1, comprising:

an initialization signal bus providing the first initialization signal Vi1 for the first pixel circuit and providing the second initialization signal Vi2 for the second pixel circuit; wherein when the initialization module in the first pixel circuit is turned on, the initialization module in the second pixel circuit is turned off, and a signal on the initialization signal bus is the first initialization signal Vi1; and when the initialization module in the first pixel circuit is turned off, the initialization module in the second pixel circuit is turned on, and a signal on the initialization signal bus is the second initialization signal Vi2.

5. The display panel according to claim 1, comprising:

a first initialization signal bus and a second initialization signal bus; wherein the first initialization signal bus provides the first initialization signal Vi1 for the first display region through a first initialization signal line; and the second initialization signal bus provides the second initialization signal Vi2 for the second display region through a second initialization signal line.

6. The display panel according to claim 1, wherein in at least one stage of the working process of the display panel, a working process of the first pixel circuit comprises a first data write frame and a first retention frame, and a working process of the second pixel circuit comprises a second data write frame and a second retention frame; wherein a first bias adjustment signal is Vb11 in the first data write frame, a first bias adjustment signal is Vb12 in the first retention frame;

a second bias adjustment signal is Vb21 in the second data write frame, and a second bias adjustment signal is Vb22 in the second retention frame;

wherein $$Vb11 \neq Vb21,$$

and/or $$Vb12 \neq Vb22.$$

7. The display panel according to claim 6, wherein $|Vb11-Vb21|=|Vb12-Vb22|$.

8. The display panel according to claim 6, wherein $$|Vb11 - Vb21| > |Vb12 - Vb22|;$$

or $$|Vb11 - Vb21| < |Vb12 - Vb22|.$$

9. The display panel according to claim 1, wherein the pixel circuit comprises at least one of:

a data write module connected to a first electrode of the drive transistor and configured to provide a data signal for the drive transistor;

a compensation module connected between a gate of the drive transistor and a second electrode of the drive transistor;

a reset module connected to a gate of the drive transistor or a second electrode of the drive transistor and configured to provide a reset signal for the drive transistor; or a light emission control module connected between a first power signal terminal and the drive transistor or between the drive transistor and the light-emitting element and configured to selectively allow the light-emitting element to enter a light emission stage.

10. The display panel according to claim 1, wherein the pixel circuit comprises a first presetting module, and a terminal of the first presetting module is connected to the drive transistor; wherein a control terminal of the first presetting module in the first pixel circuit is configured to receive a first control signal, and a control terminal of the first presetting module in the second pixel circuit is configured to receive a second control signal; and in at least one stage of the working process of the display panel, a pulse variation frequency of the first control signal is F1, and a pulse variation frequency of the second control signal is F2, wherein F1≠F2.

11. The display panel according to claim 10, wherein $$F1 > F2;$$

and $$|F1/F2| > |Vb1/Vb2|$$

and/or $$|F1/F2| > |Vi1/Vi2|.$$

12. The display panel according to claim 10, wherein when $$F1 > F2 > F01, |F1/F2| < |Vb1/Vb2|;$$

and when $$F01 > F1 > F2, |F1/F2| > |Vb1/Vb2|.$$

13. The display panel according to claim 10, wherein when $$F1 > F2 > F02, |F1/F2| < |Vi1/Vi2|;$$

and when $$F02 > F1 > F2, |F1/F2| > |Vi1/Vi2|.$$

14. The display panel according to claim 10, wherein the working process of the display panel comprises a first stage and a second stage;

a pulse variation frequency of the first control signal received by the first pixel circuit in the first stage minus a pulse variation frequency of the first control signal received by the first pixel circuit in the second stage is ΔF1;

and a first bias adjustment signal received by the first pixel circuit in the first stage minus a first bias adjustment signal received by the first pixel circuit in the second stage is ΔVb;

wherein $$\Delta F1 \times \Delta Vb < 0,$$

or $$\Delta F1 \times \Delta Vb > 0.$$

15. The display panel according to claim 14, wherein an absolute value of a ratio of the pulse variation frequency of the first control signal received by the first pixel circuit in the first stage to the pulse variation frequency of the first control signal received by the first pixel circuit in the second stage is R11; and an absolute value of a ratio of the first bias adjustment signal received by the first pixel circuit in the first stage to the first bias adjustment signal received by the first pixel circuit in the second stage is R12;

wherein $$\Delta F1 > 0$$

and $$R11 > R12.$$

16. The display panel according to claim 10, wherein the working process of the display panel comprises a third stage and a fourth stage;

a pulse variation frequency of a first control signal received by the first pixel circuit in the third stage minus a pulse variation frequency of a first control signal received by the first pixel circuit in the fourth stage is ΔF2; and a first initialization signal received by the first pixel circuit in the third stage minus a first initialization signal received by the first pixel circuit in the fourth stage is ΔVi;

wherein $$\Delta F2 \times \Delta Vi > 0$$

or $$\Delta F2 \times \Delta Vi < 0.$$

17. The display panel according to claim 16, wherein an absolute value of a ratio of the pulse variation frequency of the first control signal received by the first pixel circuit in the third stage to the pulse variation frequency of the first control signal received by the first pixel circuit in the fourth stage is R21; and an absolute value of a ratio of the first initialization signal received by the first pixel circuit in the third stage to the first initialization signal received by the first pixel circuit in the fourth stage is R22;

wherein $$\Delta F2 > 0$$

and $$R21 > R22.$$

18. The display panel according to claim 10, wherein the first presetting module is a data write module connected to a first electrode of the drive transistor and configured to provide a data signal for the drive transistor; or the first presetting module is a compensation module connected between a gate of the drive transistor and a second electrode of the drive transistor; or the first presetting module is a reset module connected to a gate of the drive transistor or a second electrode of the drive transistor and configured to provide a reset signal for the drive transistor; or the first presetting module is the bias adjustment module.

19. An integrated chip, wherein the integrated chip is configured to provide at least one of the first bias adjustment signal Vb1 and/or the second bias adjustment signal Vb2 for a display panel; or the integrated chip is configured to provide at least one of the first initialization signal Vi1 and/or the second initialization signal Vi2 for a display panel;

wherein the display panel comprises:

a first display region and a second display region; and a pixel circuit comprising a first pixel circuit and a second pixel circuit, wherein the first pixel circuit is connected to a light-emitting element in the first display region, and the second pixel circuit is connected to a light-emitting element in the second display region;

wherein in at least one stage of a working process of the display panel, the light-emitting element in the first display region works in a first brightness mode, the light-emitting element in the second display region works in a second brightness mode, brightness in the first brightness mode is L1, and brightness in the second brightness mode is L2, wherein L1≠L2;

wherein the pixel circuit comprises a drive transistor and a bias adjustment module, the a bias adjustment module is connected to a first electrode of the drive transistor or a second electrode of the drive transistor and configured to provide a bias adjustment signal for the drive transistor; the bias adjustment module in the first pixel circuit is configured to receive a first bias adjustment signal Vb1, and the bias adjustment module in the second pixel circuit is configured to receive a second bias adjustment signal Vb2; wherein Vb1≠Vb2;

and/or wherein the pixel circuit comprises an initialization module, and the initialization module is connected to the light-emitting element and configured to provide an initialization signal for the light-emitting element; the initialization module in the first pixel circuit is configured to provide a first initialization signal Vi1, and the initialization module in the second pixel circuit is configured to provide a second initialization signal Vi2; wherein Vi1≠Vi2.

20. A display device, comprising a display panel, wherein the display panel comprises:

a first display region and a second display region; and a pixel circuit comprising a first pixel circuit and a second pixel circuit, wherein the first pixel circuit is connected to a light-emitting element in the first display region, and the second pixel circuit is connected to a light-emitting element in the second display region;

wherein in at least one stage of a working process of the display panel, the light-emitting element in the first display region works in a first brightness mode, the light-emitting element in the second display region works in a second brightness mode, brightness in the first brightness mode is L1, and brightness in the second brightness mode is L2, wherein L1≠L2;

wherein the pixel circuit comprises a drive transistor and a bias adjustment module, the a bias adjustment module is connected to a first electrode of the drive transistor or a second electrode of the drive transistor and configured to provide a bias adjustment signal for the drive transistor; the bias adjustment module in the first pixel circuit is configured to receive a first bias adjustment signal Vb1, and the bias adjustment module in the second pixel circuit is configured to receive a second bias adjustment signal Vb2; wherein Vb1≠Vb2;

and/or wherein the pixel circuit comprises an initialization module, and the initialization module is connected to the light-emitting element and configured to provide an initialization signal for the light-emitting element; the initialization module in the first pixel circuit is configured to provide a first initialization signal Vi1, and the initialization module in the second pixel circuit is configured to provide a second initialization signal Vi2; wherein Vi1≠Vi2.

* * * * *